United States Patent
Qian et al.

(10) Patent No.: US 10,107,414 B2
(45) Date of Patent: Oct. 23, 2018

(54) INTERMEDIATE BULK CONTAINER AND VALVE OPENING/CLOSING DEVICE THEREFOR

(71) Applicant: SHANGHAI HONGYAN RETURNABLE TRANSIT PACKAGINGS CO., LTD, Shanghai (CN)

(72) Inventors: Zuocheng Qian, Shanghai (CN); Zhengwei Fang, Shanghai (CN); Kai Gong, Shanghai (CN)

(73) Assignee: SHANGHAI HONGYAN RETURNABLE TRANSIT PACKAGINGS CO., LTD., Shanghai (CN)

( * ) Notice: Subject to any disclaimer, the term of this patent is extended or adjusted under 35 U.S.C. 154(b) by 121 days.

(21) Appl. No.: 14/422,137

(22) PCT Filed: Aug. 16, 2013

(86) PCT No.: PCT/CN2013/081650
§ 371 (c)(1),
(2) Date: Apr. 24, 2015

(87) PCT Pub. No.: WO2014/026642
PCT Pub. Date: Feb. 20, 2014

(65) Prior Publication Data
US 2015/0233491 A1    Aug. 20, 2015

(30) Foreign Application Priority Data
Aug. 16, 2012   (CN) .......................... 2012 1 0292806

(51) Int. Cl.
*F16K 31/60*   (2006.01)
*B65D 90/66*   (2006.01)

(52) U.S. Cl.
CPC .............. *F16K 31/60* (2013.01); *B65D 90/66* (2013.01)

(58) Field of Classification Search
CPC .......... F16K 31/60; F16K 31/46; F65D 19/02; F65D 77/061; F65D 19/06;
(Continued)

(56) References Cited

U.S. PATENT DOCUMENTS 1,624,168 A * 4/1927 Gschwind ............ F01P 11/0276
                                                        137/245.5
2,030,332 A * 2/1936 Spear ...................... F16K 31/46
                                                        251/144
(Continued)

FOREIGN PATENT DOCUMENTS

CN        2051263        1/1990
CN       201276237       7/2009
(Continued)

OTHER PUBLICATIONS

International Search Report for application No. PCT/CN2013/081650, dated Oct. 31, 2013 (14 pages).
(Continued)

*Primary Examiner* — Marina Tietjen
(74) *Attorney, Agent, or Firm* — Hamre, Schumann, Mueller & Larson, P.C.

(57) ABSTRACT

The present invention discloses an intermediate bulk container and a valve opening/closing device therefor. The container comprises a base, side plates, and a valve installed at the bottom of the container. The valve opening/closing device comprises a handle, a motion-transferring device, a valve opening/closing mechanism and a clutch device. The handle is installed on the side plate and is connected to the motion-transferring device. The motion-transferring device is used to transfer the actions acting on the handle to the
(Continued)

valve opening/closing mechanism so as to achieve opening/closing of the valve. The clutch device is used to engage the motion-transferring device with the valve opening/closing mechanism or disengage the motion-transferring device from the valve opening/closing mechanism. According to the valve opening/closing device of the present invention, the operating handle is provided at appropriate position of the side plate of the container, thereby avoiding actions such as bending over or squatting on the ground while opening/closing the valve, thus it is convenient for use and can prevent the valve from being opened by mistake.

8 Claims, 34 Drawing Sheets

(58) Field of Classification Search
CPC . F65D 2519/00805; F65D 2519/00338; F65D 90/66
USPC .................................. 251/231–237, 292–293
See application file for complete search history.

(56) References Cited

U.S. PATENT DOCUMENTS

| | | | | |
|---|---|---|---|---|
| 3,857,300 A | * | 12/1974 | O'Dell | .................... G05G 1/082 74/543 |
| 4,549,716 A | * | 10/1985 | Warren | ................... F16K 31/60 192/69.91 |
| 6,045,013 A | | 4/2000 | Yang | |
| 6,347,718 B1 | * | 2/2002 | Karpisek | .............. B65D 77/061 206/600 |
| 6,533,122 B1 | * | 3/2003 | Plunkett | ................. B65D 19/12 206/600 |
| 6,959,914 B1 | * | 11/2005 | Corral | ..................... E03C 1/021 251/293 |
| 2002/0109119 A1 | * | 8/2002 | Stolzman | ............... F16K 5/0442 251/309 |
| 2007/0227938 A1 | * | 10/2007 | Higgins | ................. B65D 19/12 206/600 |
| 2009/0294486 A1 | | 12/2009 | McKnight et al. | |

FOREIGN PATENT DOCUMENTS

| | | |
|---|---|---|
| CN | 102322536 | 1/2012 |
| CN | 102808989 | 12/2012 |
| CN | 102808990 | 12/2012 |
| CN | 102840381 | 12/2012 |
| CN | 202852157 | 4/2013 |
| CN | 202992355 | 6/2013 |
| CN | 203099049 | 7/2013 |
| WO | WO 90/08707 | 8/1990 |

OTHER PUBLICATIONS

Extended European Search Report, dated Apr. 11, 2016, European Patent Application No. 13829456.6, 6 pages.
Office Action for Chinese Patent Application No. 201210292806.3, dated Jul. 25, 2013, 4 pages.
Office Action for Chinese Patent Application No. 201210292806.3, dated Feb. 8, 2014, 4 pages.

* cited by examiner

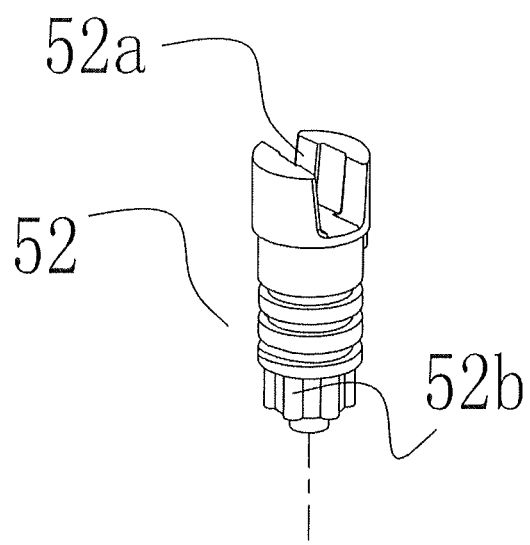
Fig. 19
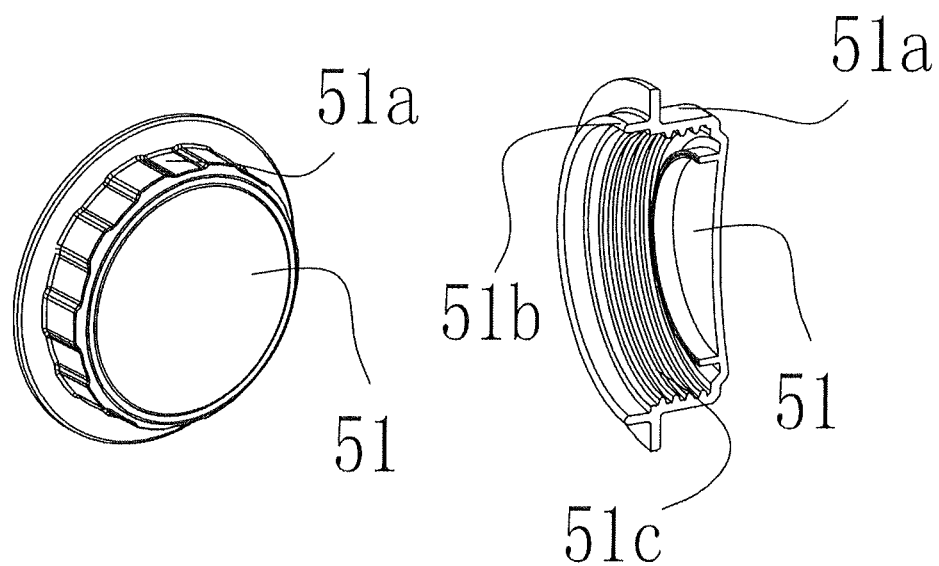
Fig. 20a
Fig. 20b

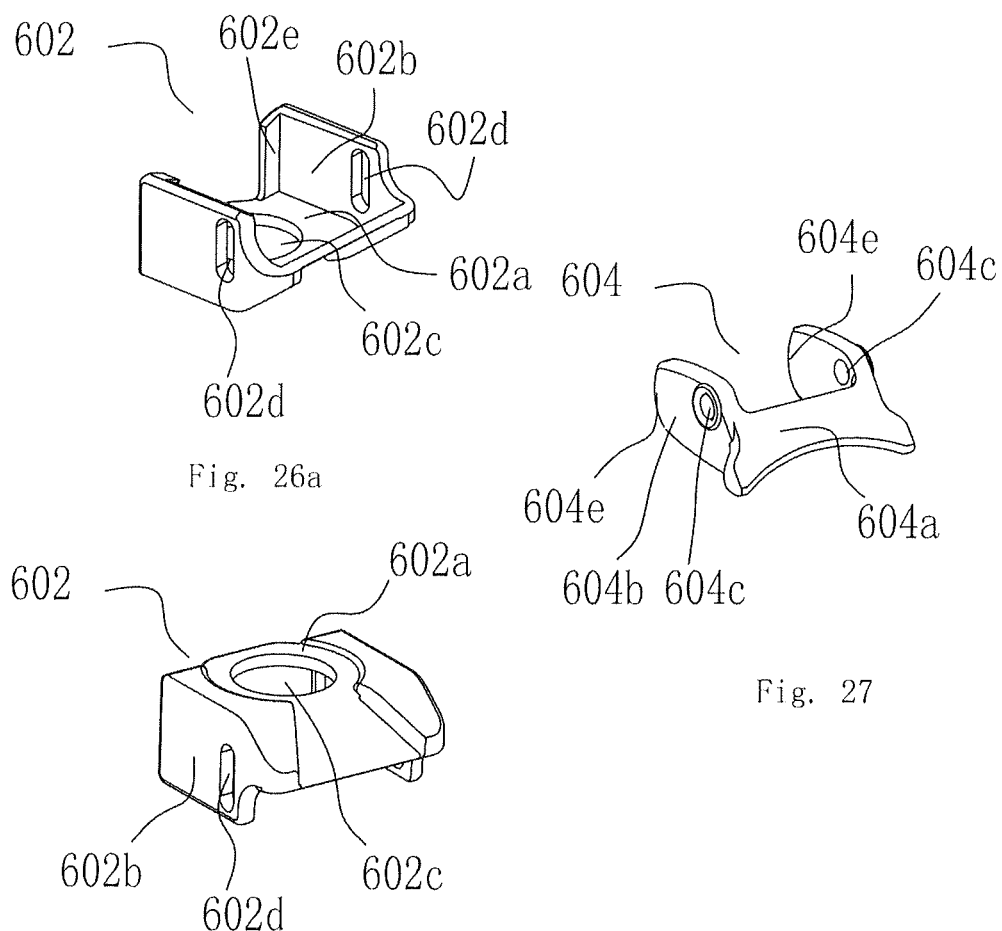

INTERMEDIATE BULK CONTAINER AND VALVE OPENING/CLOSING DEVICE THEREFOR

FIELD

The present invention relates to intermediate bulk containers, in particular to valve opening/closing devices used in the containers.

BACKGROUND

The valve opening/closing device of an existing intermediate bulk container is typically provided at the valve base, thus a user must bend over or squat on the ground for operation when opening or closing the valve. The length of the lever arm is relatively limited, and typically, the dimensions of the valve opening/closing device can not be very large, thus a relatively large force for operating is needed. Moreover, the position of the valve with respect to the side plate is heavily restricted.

In addition, many of the existing valves are already provided with mistakenly-opening preventing devices, for example, for ball valves, a rear cover is provided to contact with, withstand, and stop the valve opening handle, so as to achieve the effect of mistakenly-opening prevention. However, the existing mistakenly-opening device employs rigid connection, thus forced opening may lead to damage of the valve, such as fracture of the handle.

SUMMARY

The object of the present invention is to provide a valve opening/closing device that not only is facilitated to use and can open or close the valve without bending over or squatting on the ground, but also can prevent the valve from being opened by mistake.

To achieve the object mentioned above, the present invention provides a valve opening/closing device used for intermediate bulk containers (IBC), the container comprises a base and side plates, the valve is installed at the bottom of the container, wherein:

the valve opening/closing device comprises a handle, a motion-transferring device, a valve opening/closing mechanism and a clutch device; wherein, the motion-transferring device is used to transfer the actions acting on the handle to the valve opening/closing mechanism so as to achieve opening/closing of the valve; and the clutch device is used to engage the motion-transferring device with the valve opening/closing mechanism or disengage the motion-transferring device from the valve opening/closing mechanism.

In a preferred embodiment, the handle is mounted on the side plate of the container and is connected to the motion-transferring device, wherein the motion-transferring device is received between two sidewalls of the side plate of the container; the motion-transferring device comprises a connecting tube connected to the handle, a middle connecting section connected to the connecting tube, and a lower connecting section connected to the middle connection section; and the connecting tube, the middle connection section and the lower connecting section constitute an universal mechanism, so that even if the rotating axis of the handle and the rotating axis of the valve stem of the valve are not in a same line, the force acted on the handle still will be transferred to the connecting tube and the lower connecting section, so as to achieve opening/closing of the valve.

In a preferred embodiment, the clutch device comprises a driving mechanism and a clutch mechanism, wherein the driving mechanism will drive the clutch mechanism to operate, so as to achieve the engagement of the motion-transferring device with the valve opening/closing mechanism or disengagement the motion-transferring device from the valve opening/closing mechanism.

In the embodiment described above, preferably, the valve opening/closing device may further comprises a handle fixing member, wherein one end of the handle fixing member is provided with a spline and the other end is provided with a rotation-stopping projection and elastic buttons, wherein the handle is provided with a spline groove used to engage with the spline, and both ends of the connecting tube are provided with rotation-stopping slots and positioning holes.

In the embodiment described above, preferably, the valve opening/closing device may further comprise an upper connecting section, wherein one end of the upper connecting section is provided with elastic buttons and a rotation-stopping projection, the other end is provided with connecting ears, wherein the connecting ears are provided with connecting holes; and the elastic buttons and rotation-stopping projection are engaged with the positioning holes and the rotation-stopping slots on the other end of the connecting tube respectively.

In the embodiment described above, preferably, the valve opening/closing device may further comprises a cross member, wherein the cross member is provided with four crossed radially projecting shafts, wherein the middle connecting section is provided with connecting ears and connecting holes on the connecting ears, and the upper connecting section is connected to the middle connecting section through the cross member.

In the embodiment described above, preferably, one end of the lower connecting section is provided with lugs and connecting holes. The middle connecting section is connected to the lower connecting section through another cross member.

In another embodiment of the present invention, the valve opening/closing device may further comprises a handle fixing base used to secure and install the handle on the side plate of the container.

In the embodiment described above, the valve opening/closing device may further comprises a handle restoring spring, which can be embedded in the handle and mounted into the fixing base with the handle.

In another embodiment of the present invention, the clutch device comprises a clutch rod, a clutch lifting platform, a clutch bracket, a control member and a valve cover, wherein the clutch lifting platform and the control member are installed on the clutch bracket, and the clutch lifting platform can move up and down under the interaction between the control member and the valve cover, so as to achieve the connection and disconnection between the motion-transferring device and the valve stem of the valve.

In the embodiment described above, preferably, the clutch bracket is provided with rotating pins. The clutch lifting platform is provided with through-holes for the passage of the valve stem of the valve as well as lifting limiting slots and racks at both sides of the through-holes. The control member comprises a press-plate, and two arms extending from both ends of the press-plate respectively, wherein the arms are provided with gears at the end of the arms and rotating holes; and the racks of the clutch lifting platform are engaged with the gears of the control member, and the control member rotates about the rotating pins of the clutch bracket, so that the clutch lifting platform moves up and down, thereby achieving the engagement of the motion-transferring device with the clutch rod or disengagement of the motion-transferring device from the clutch rod.

In the embodiment described above, preferably, the clutch bracket is provided with rotating pins; the clutch lifting platform is provided with through-holes for the passage of the valve stem of the valve and lifting limiting slots at both sides of the through-holes. The control member comprises a press-plate, and two arms extending from both ends of the press-plate, wherein the arms are provided with cams at the end of the arms and rotating holes; and the control member rotates about the rotating pins of the clutch bracket and the cams of the control member are engaged with the clutch lifting platform, so that the clutch lifting platform moves up and down, thereby achieving the engagement of the motion-transferring device with the clutch lifting platform or disengagement of the motion-transferring device from the clutch lifting platform.

In another embodiment of the present invention, the clutch device comprises a clutch lifting platform, a restoring spring and a control member, wherein the valve stem of the valve is received in the clutch lifting platform, and the clutch lifting platform moves up and down under the interaction between the control member and the valve cover, so as to achieve the engagement of the clutch lifting platform with the motion-transferring device or disengagement of the clutch lifting platform from the motion-transferring device.

In the embodiment described above, preferably, the valve stem of the valve comprises a rod body, wherein the lower end of the rod body is provided with a spline used to be engaged with the valve core, and the upper end of the rod body is sequentially provided with positioning projections and limiting projections used to be engaged with the clutch lifting platform. The clutch lifting platform comprises a cylindrical body, wherein the lower end of the cylindrical body is provided with a radial projection, and the upper end of the cylindrical body is provided with a connecting slot used to be engaged with the motion-transferring device, wherein the cylindrical body is further provided with a positioning groove used to be engaged with the positioning projection on the valve stem, a position limiting table used to be engaged with the limiting projection on the valve stem, and a groove used to receive the restoring spring. The control member is U-shaped member. The upper surfaces of the two arms of the U-shaped member are provided with acting surfaces and bevels; and the acting surfaces and bevels of the U-shaped member are engaged with the upper surfaces of the radial projection of the clutch lifting platform when assembled, so as to achieve the ascending/descending of the clutch lifting platform, thereby achieving the engagement of the motion-transferring device with the clutch lifting platform or disengagement of the motion-transferring device from the clutch lifting platform.

The present invention also provide a intermediate bulk container (IBC) comprising a base, side plates and a valve installed at the bottom of the container, wherein the container further comprises a valve opening/closing device described in embodiments above.

According to the valve opening/closing device of the present invention, the operating handle is provided at an appropriate position of the side plate of the container, thereby avoiding bending over or squatting on the ground when opening or closing the valve, etc, which is convenient for use. Further, the motion-transferring device is installed inside the side plate, thus during the usage of the intermediate bulk container, the overall volume ratio will not be affected, and the folding level will not be increased when the folding the intermediate bulk storage container. Moreover, the operating handle or lever on the side plate can be made in different sizes as needed, and moment arms of different lengths make it easy to control the operating force. Besides, the valve opening/closing device of the present invention is also provided with a clutch device. When the valve is closed, the clutch device disconnects the valve stem and the motion-transferring device, thereby preventing the valve from being opened by mistake.

DRAWINGS

FIGS. 10a-10c illustrate the structure of lower connecting section of the valve opening/closing device according to the first embodiment of the present invention, wherein, FIGS. 10a, 10b are structural perspective views of the lower connecting section, and FIG. 10c is a sectional view;

FIG. 19 illustrates a perspective structural view of the valve stem of the valve.

FIGS. 20a-20b illustrate perspective structural views of the valve cover;

FIGS. 26a-26b illustrate perspective structural views of the clutch lifting platform of the valve opening/closing device according to the second embodiment of the present invention;

FIG. 27 illustrates a perspective structural view of the control member of the valve opening/closing device according to the second embodiment of the present invention;

Figure 42:
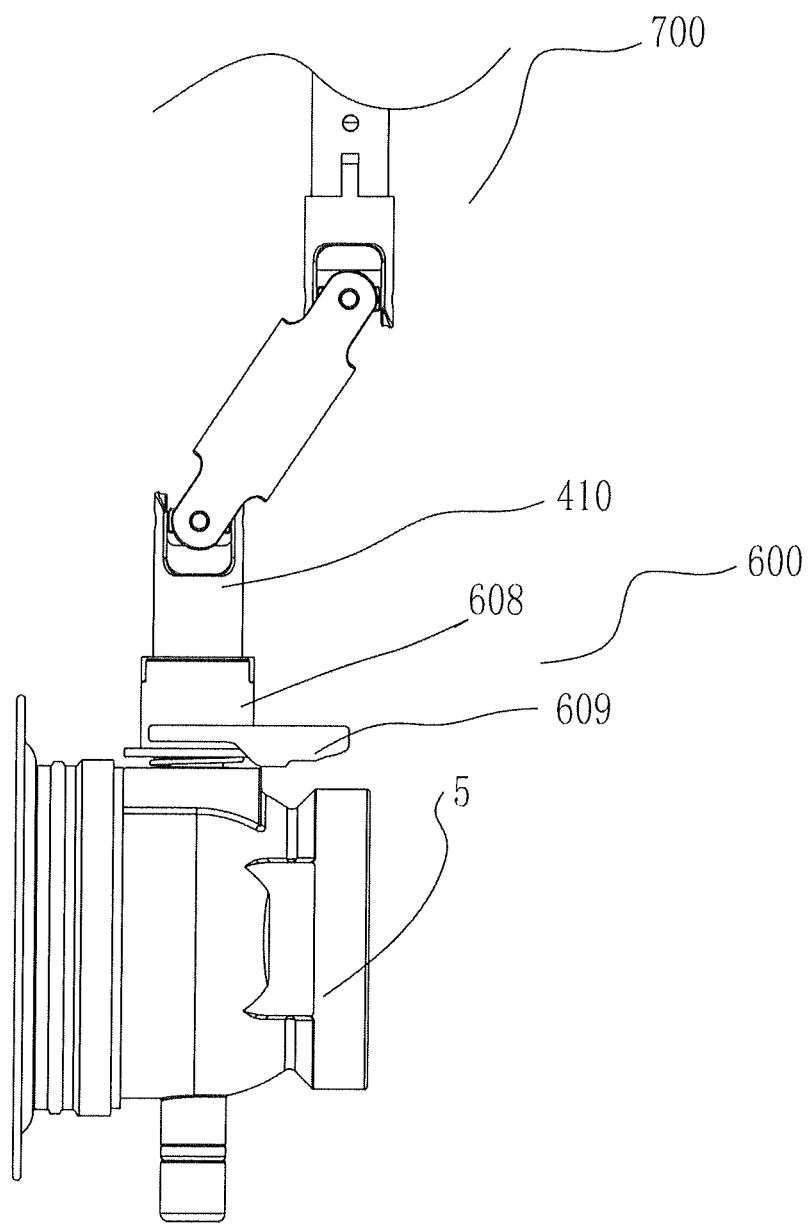
Figure 43:
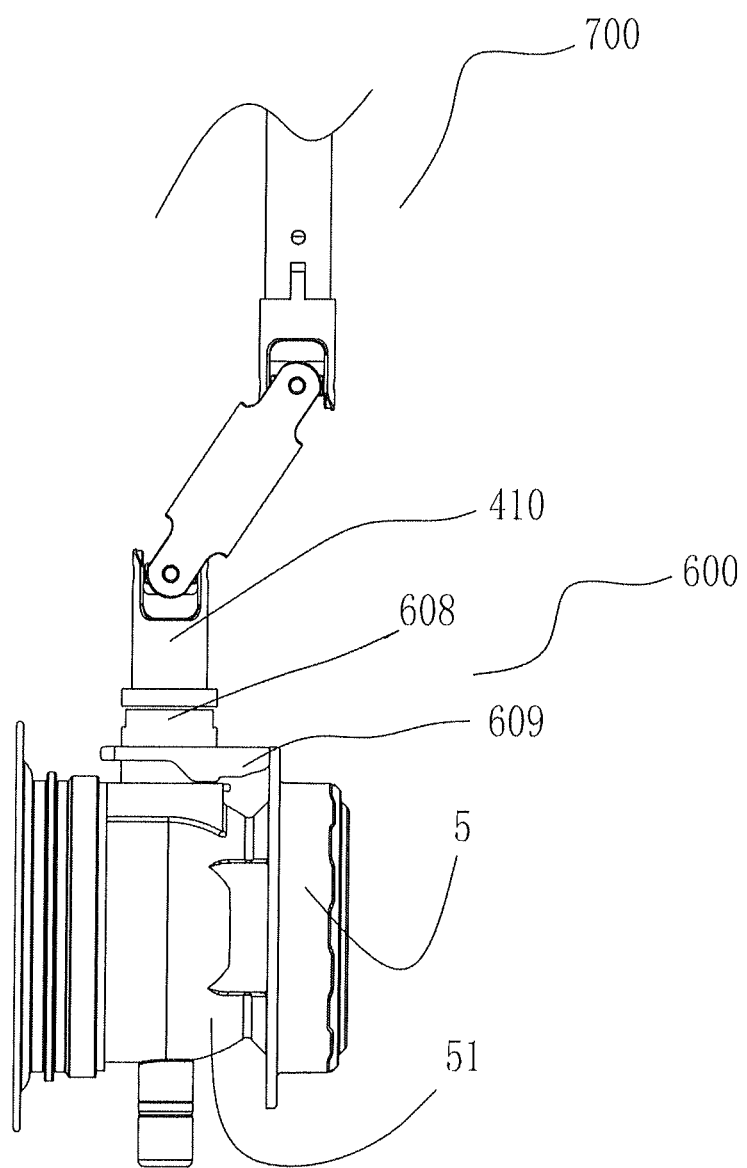

FIG. 42 illustrates a perspective view of the valve opening/closing device according to the third embodiment of the present invention, wherein the valve opening/closing device is in a connected state; and FIG. 43 illustrates a perspective view of the valve opening/closing device according to the third embodiment of the present invention, wherein the valve opening/closing device is in a disconnected state.

DESCRIPTIONS

Hereinafter, preferred embodiment of the present invention will be described in detail with reference to the drawings, so that the purposes, features and advantages of the present invention will be more clearly understood. It should be understood that the embodiments shown in the drawings are not to limit the scope of the invention, but merely to illustrate the true spirit of the technical solutions of the present invention. Hereinafter, the same or similar components are denoted by like reference numerals.

Herein, the intermediate bulk containers (IBC) are packaging containers widely used in food, biochemical, pharmaceutical, chemical and other industries worldwide. IBC can be reused many times and have distinct advantages for filling, storage and transportation. Compared with drums, IBC containers can save 35% of the storage space, have dimensions conforming to ISO standards, are suitable for aseptic filling and have a compact structure, are convenient for bulk storage with safety and efficiency, and thus widely used in the transportation, packaging, storage process of liquids, granules, flakes and materials of other forms. Currently, there are three main existing specifications, including 820 L, 1000 L and 1250 L. Typically, the IBC comprises a plastic liner, a filling port, a discharge valve, side plates, a base and a cover. Most of liquids or particles stored in IBC are pharmaceutical intermediates, beverage concentrates, food additives and even dangerous materials, etc., which are not only expensive but also related with sanitation and safety, therefore, protection functions used to prevent unauthorized opening or discharging are needed during operation.

Figure 1:
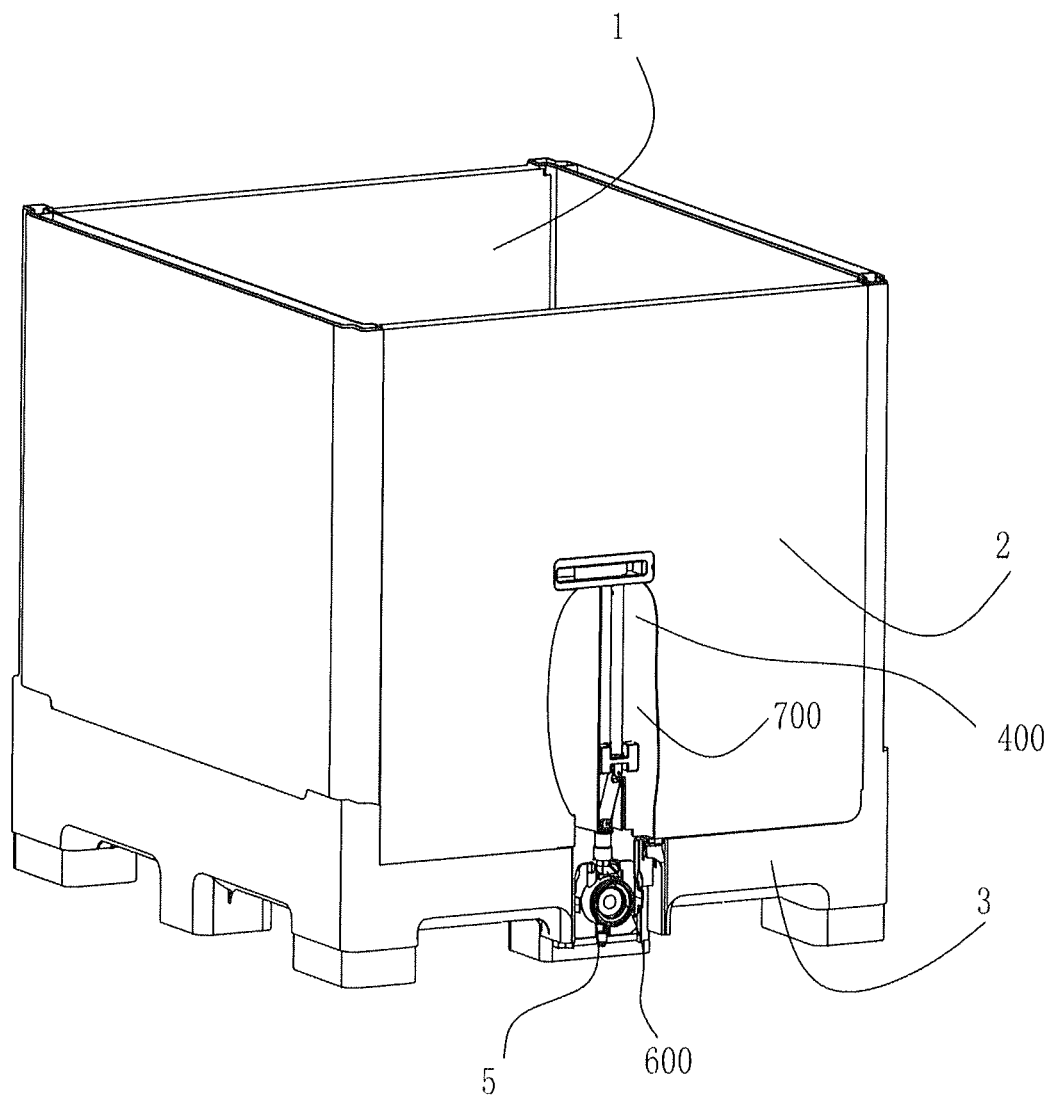
FIG. 1 is a schematic structural perspective view of an intermediate bulk container provided with a valve opening/closing device of the present invention.

FIG. 1 is a partially sectional view of an intermediate bulk container provided with a valve opening/closing device 400 of the present invention having a mistakenly-opening preventing device 600. The bulk container 1 typically comprises a side plate 2, a base 3 and a valve 5 provided at the bottom. For existing bulk containers, the valve opening/closing device is typically provided directly on the valve, thus when you need to open or close the valve, you must squat or stoop for operation. However, as shown in FIG. 1, the intermediate bulk container 1 of the present invention is further provided with a valve opening/closing device 400. The valve opening/closing device 400 includes a handle fixing base 401 mounted on a side plate 2 of the container 1 and a handle 402, a motion-transferring device 700 located in the side plate, a valve opening/closing mechanism and a clutch device 600. Operation acting on the handle 402 may be transferred to the valve opening/closing mechanism through the motion-transferring device, thereby the operator does not have to squat or stoop in order to open and close the valve 5 located at the bottom of the container.

Figure 2:
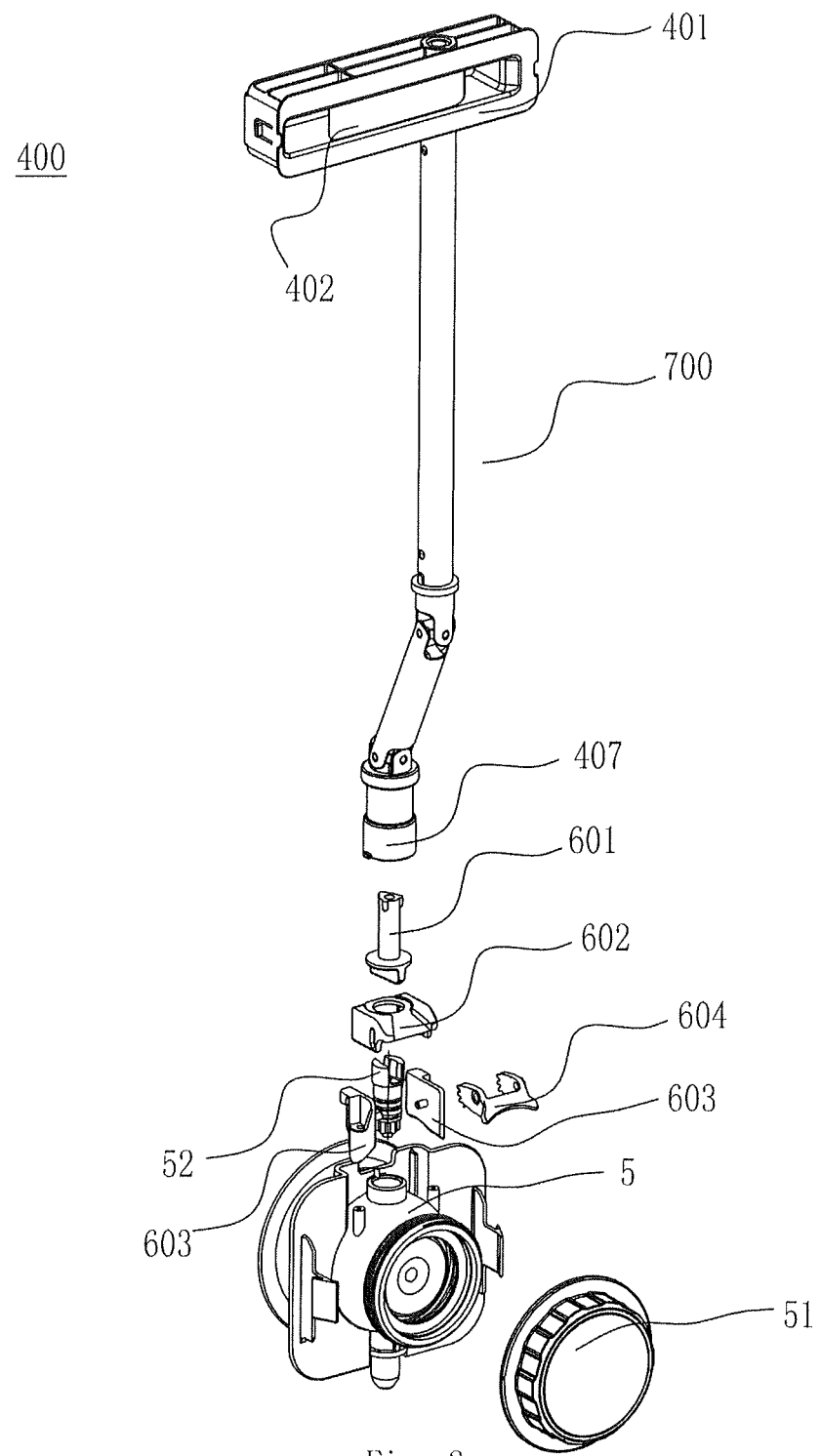
FIG. 2 is a structural perspective view of the valve opening/closing device according to the first embodiment of the present invention.

FIG. 2 illustrates the valve opening/closing device having a mistakenly-opening preventing device according to the first embodiment of the present invention. As shown in FIG. 2, the valve opening/closing device 400 includes a handle fixing base 401, a handle 402, a valve motion-transferring device 700, a valve opening/closing mechanism, and a clutch device 600. Wherein the valve opening/closing mechanism is a valve stem connected with a valve core of the valve, and the clutch device 600 includes a clutch rod 601, a clutch lifting platform 602, a clutch bracket 603, a control member 604, and a valve cover 51. Wherein, the clutch rod 601, the clutch lifting platform 602, the clutch bracket 603, and the control member 604 constitute a clutch mechanism, while the valve cover 51 is a driving mechanism used to drive the clutch mechanism. The clutch lifting platform 602 can move up and down under the interaction between the control member 604 and the valve cover 51, so as to achieve the connection and disconnection between the clutch rod 601 and the valve stem 52, which will be described in more detail hereinafter.

Figure 3:
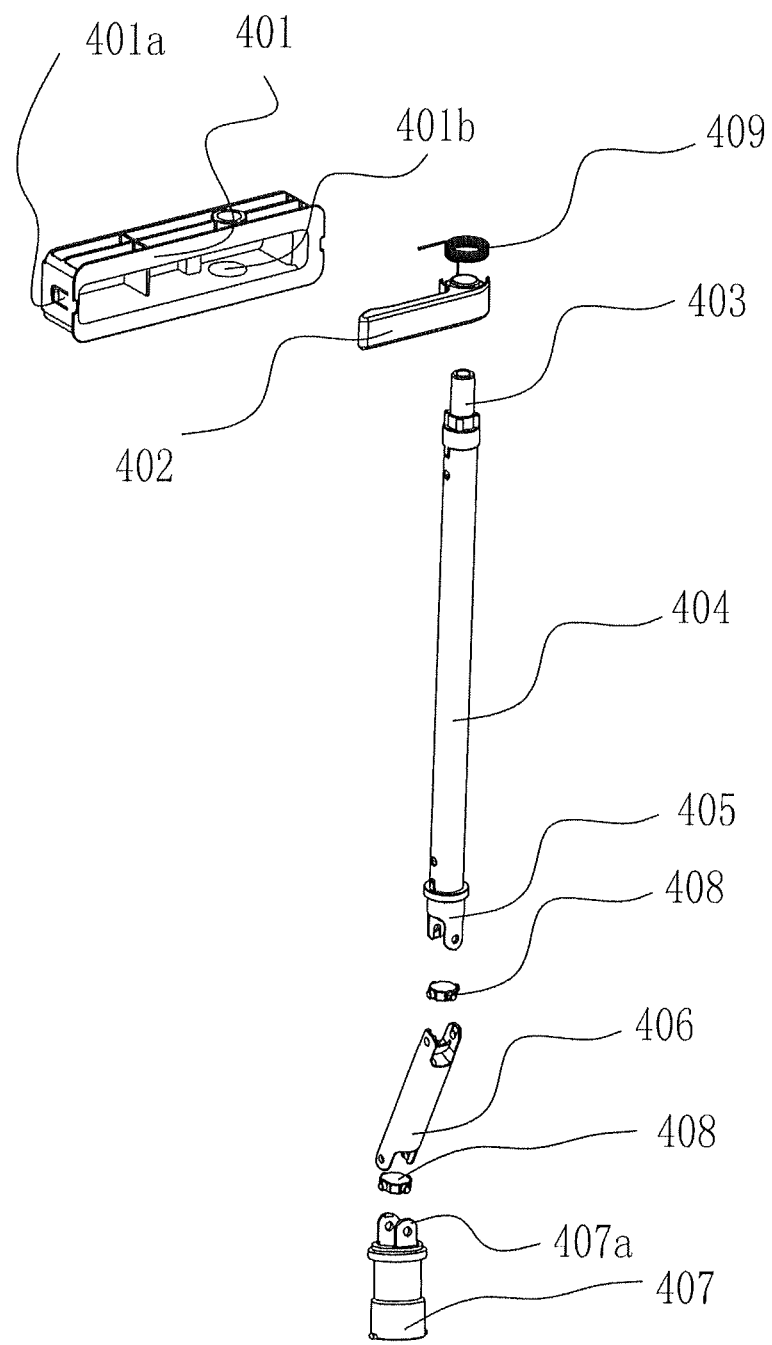
FIG. 3 is an exploded perspective view of a motion-transferring device in FIG. 2.

FIGS. 3-8 illustrate perspective structural views of the motion-transferring device in FIG. 2. As shown in FIG. 3, the motion-transferring device comprises a handle-connecting member 403, a connecting tube 404, an upper connecting section 405, a middle connecting section 406, a lower connecting section 407, a cross member 408 and a handle restoring spring 409. The handle 402 is mounted in the fixing base 401 and is connected to one end of the handle connecting member 403. The other end of the handle connecting member 403 is connected to one end of the connecting tube 404. The other end of the connecting tube 404 is connected to one end of the middle connecting section 406 through the cross member 408, and the other end of the middle connecting section 406 is connected to one end of the lower connecting section 407 through another cross member 408. The lower connecting section 407 is connected to one end of the clutch rod 601, and the other end of the clutch rod 601 is provided with a " ⋅ "-shaped connecting head. The "—"-shaped connecting head can be engaged with a "—"-shaped connecting slot provided on the valve stem of the valve, so as to achieve the opening/closing of the valve, which will be further described hereinafter.

As shown in FIG. 3, a projection 401a and a mounting hole 401b are provided on the handle fixing base 401. The projection 401a is engaged with a groove (not shown) provided on the side plate, so as to keep the fixing base 401 in the side plate 2. It should be noted that the fixing base 401 can be kept in the side plate 2 through other means, such as through threaded connection.

Figure 4:
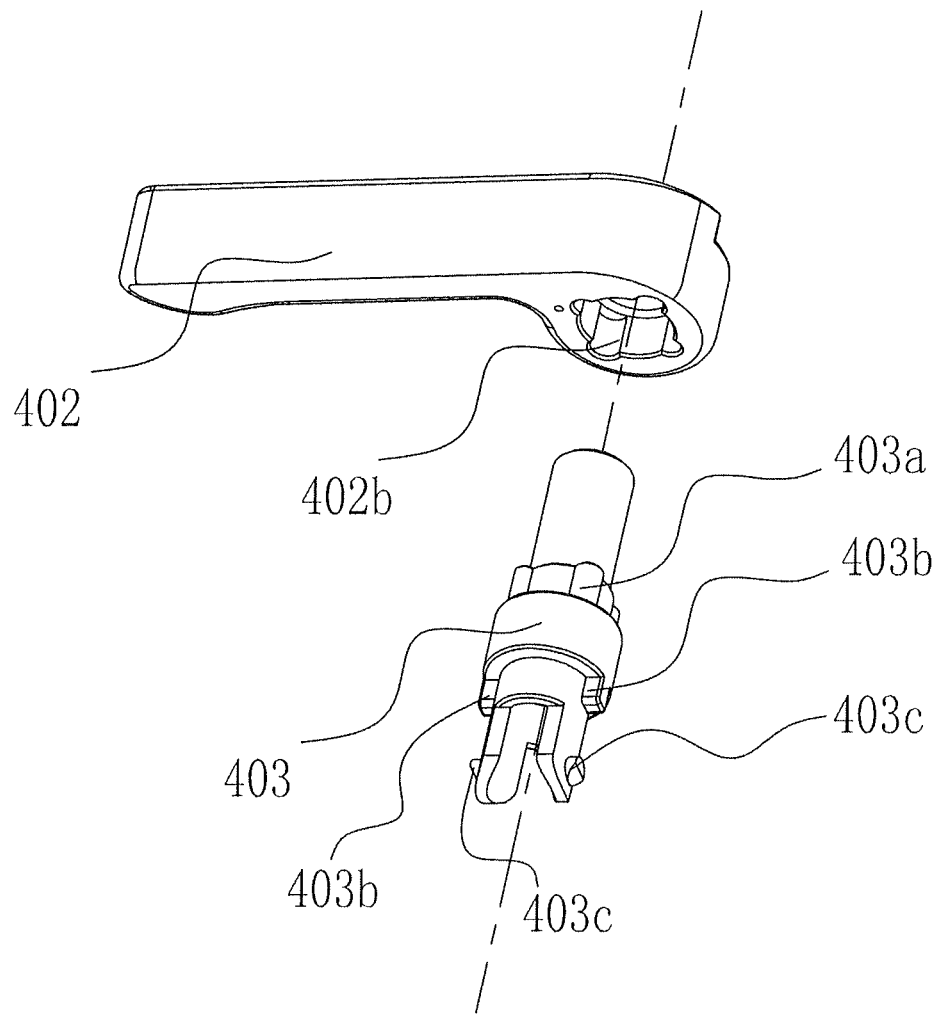
FIG. 4 is a structural perspective view of the handle and the handle-connecting member of the valve opening/closing device in FIG. 2.

As shown in FIG. 4, a handle restoring spring mounting groove and a spline groove 402b are provided at the root of the handle 402. The handle restoring spring 409 can be embedded in the handle 402, and can be mounted into the fixing base 401 together with the handle. As shown in FIG. 4, one end of the handle connecting member 403 is provided with a spline 403a, and the other end of the handle connecting member is provided with a rotation-stopping projection 403b and an elastic button 403c. During installation, one end of the handle connecting member 403 is inserted into the mounting hole 401b of the handle fixing base, and the spline 403a on the connecting member 403 is engaged with the spline groove 402b on the handle 402, so as to achieve the connection between the handle 402 and the handle connecting member 403.

Figure 5:
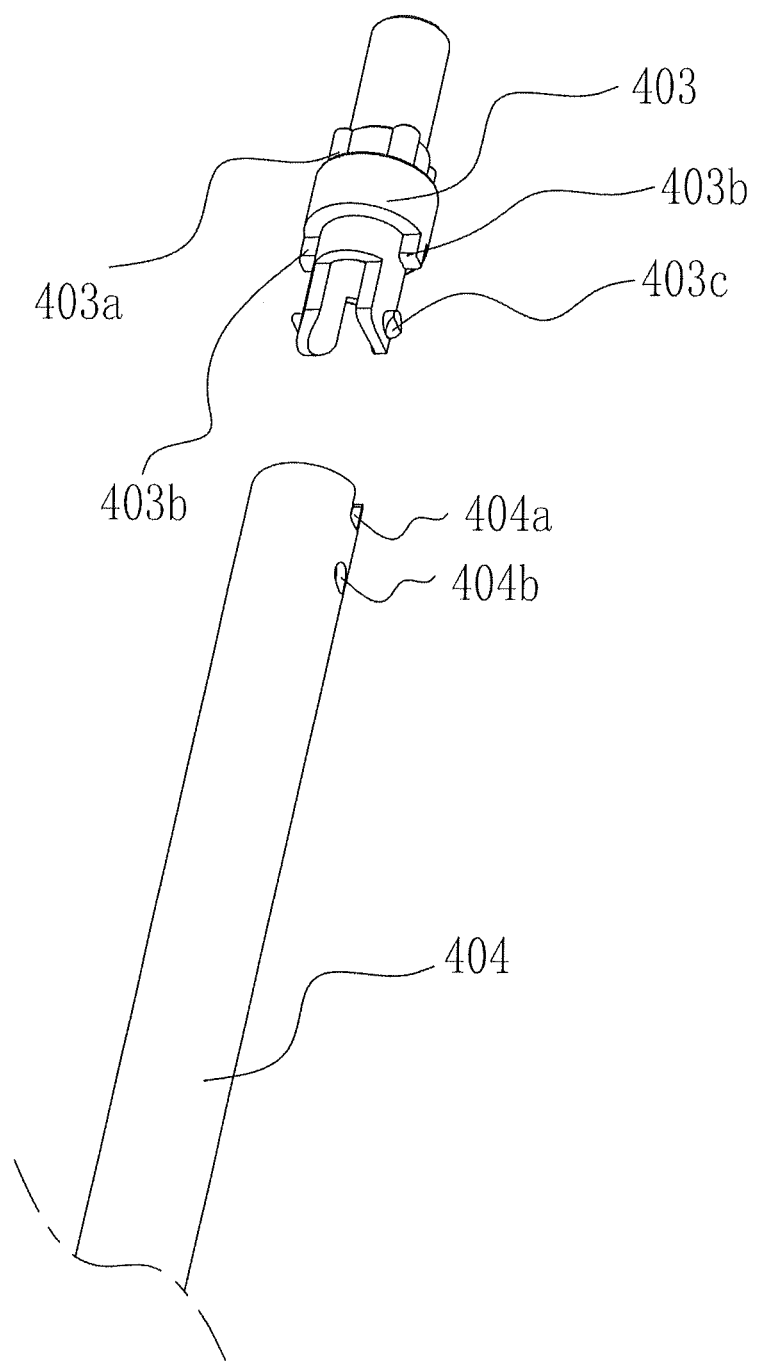
FIG. 5 is a structural perspective view of the handle-connecting member and the connecting tube of the valve opening/closing device in FIG. 2.

The rotation-stopping projection 403b and the elastic button 403c on the handle connecting member 403 are respectively engaged with the rotation-stopping slot 404a and the positioning hole 404b. That is, the rotation-stopping projection 403b and the elastic button 403c are snapped into the rotation-stopping slots 404a and the positioning hole 404b respectively, so as to achieve the connection between the connecting member 403 and the connecting tube, as shown in FIG. 5.

Figure 6:
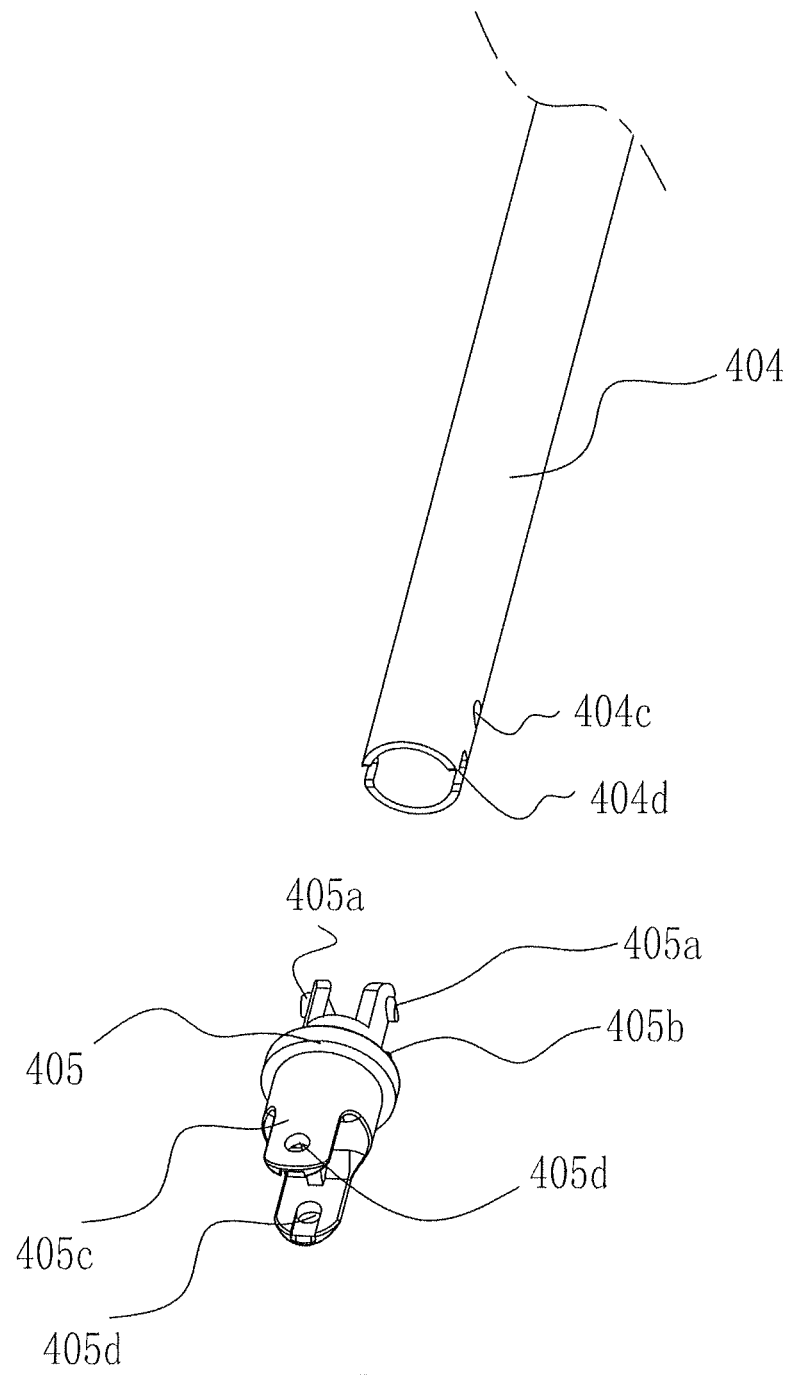
FIG. 6 is a perspective structural view of the connecting tube and the upper connecting section of the valve opening/closing device in FIG. 2.

The other end of the connecting tube 404 is also provided with positioning holes 404c and rotation-stopping slots 404d. The positioning holes 404c and the rotation-stopping slots 404d are engaged with the elastic buttons 405a and the rotation-stopping projection 405b on the other end of the upper connecting section 405, respectively. That is, the elastic button 405a and the rotation-stopping projection 405b on the upper connecting section 405 are snapped into the positioning hole 404c and the rotation-stopping slot 404d respectively, so as to achieve the connection between the connecting tube 404 and the upper connecting section 405, as shown in FIG. 6.

Figure 7:
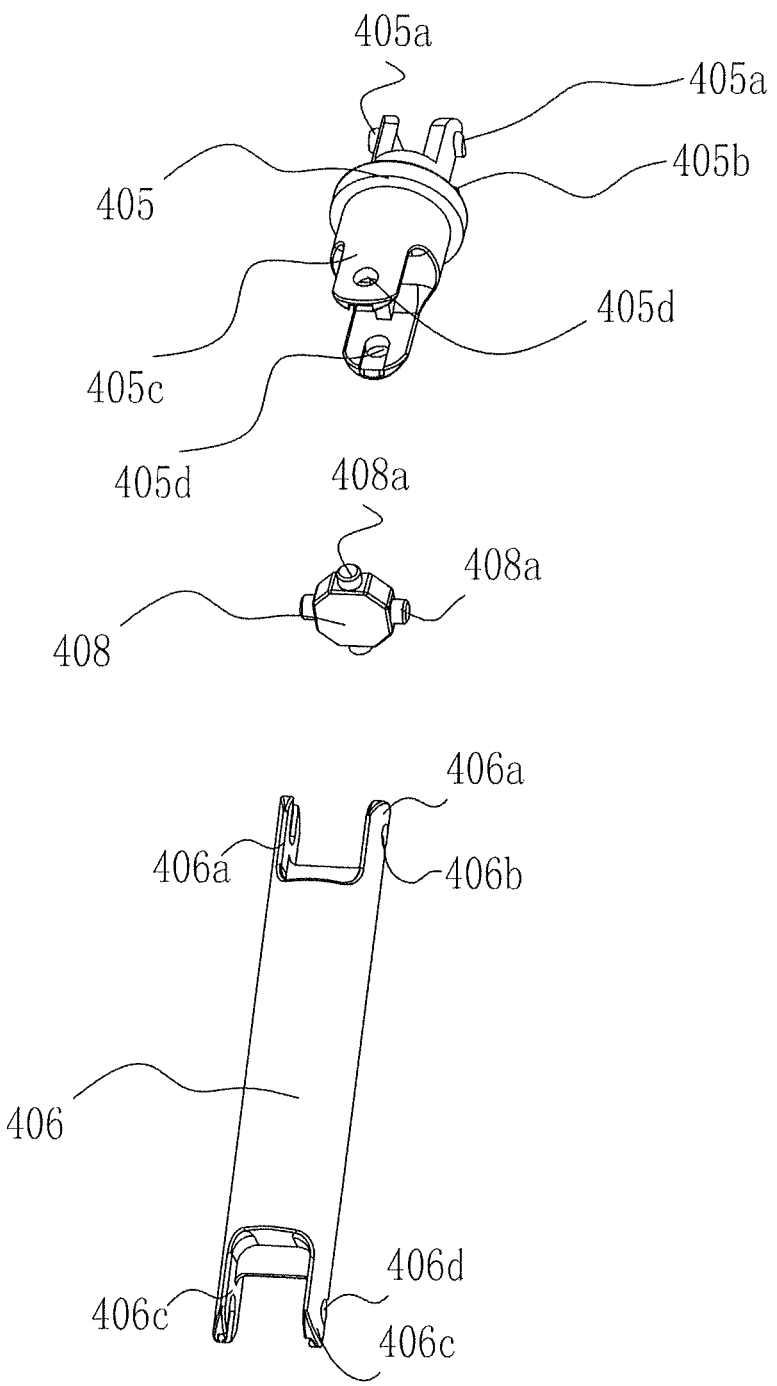
FIG. 7 is a perspective structural view of the upper connecting section, the cross member and the middle connecting section of the valve opening/closing device in FIG. 2.

Connecting ears 405c which are rigid axially and elastic radially are provided at the other end of the upper connecting section 405. The connecting ears 405c are provided with connecting holes 405d, as shown in FIGS. 6-7. Also, the two ends of the middle connecting section 406c are provided with connecting ears 406a, 406c which are rigid axially and elastic radially at two ends thereof respectively and are also provided with connecting holes 406b, 406d on the connecting ears 406a, 406c respectively. The upper connecting section 405 and the middle connecting section 406 are connected through the cross member 408. Specifically, as shown in FIG. 7, the cross member 408 is provided with four radially projecting shafts 408a which form a cross. During installation, two opposing shafts are snapped into two respective connecting holes 405d on the upper connecting section 405, while the other two opposing shafts are snapped into two respective connecting holes 406b on the middle connecting section 406, so as to achieve the connection between the upper connecting section 405 and the middle connecting section 406, as shown in FIG. 7.

Figure 8:
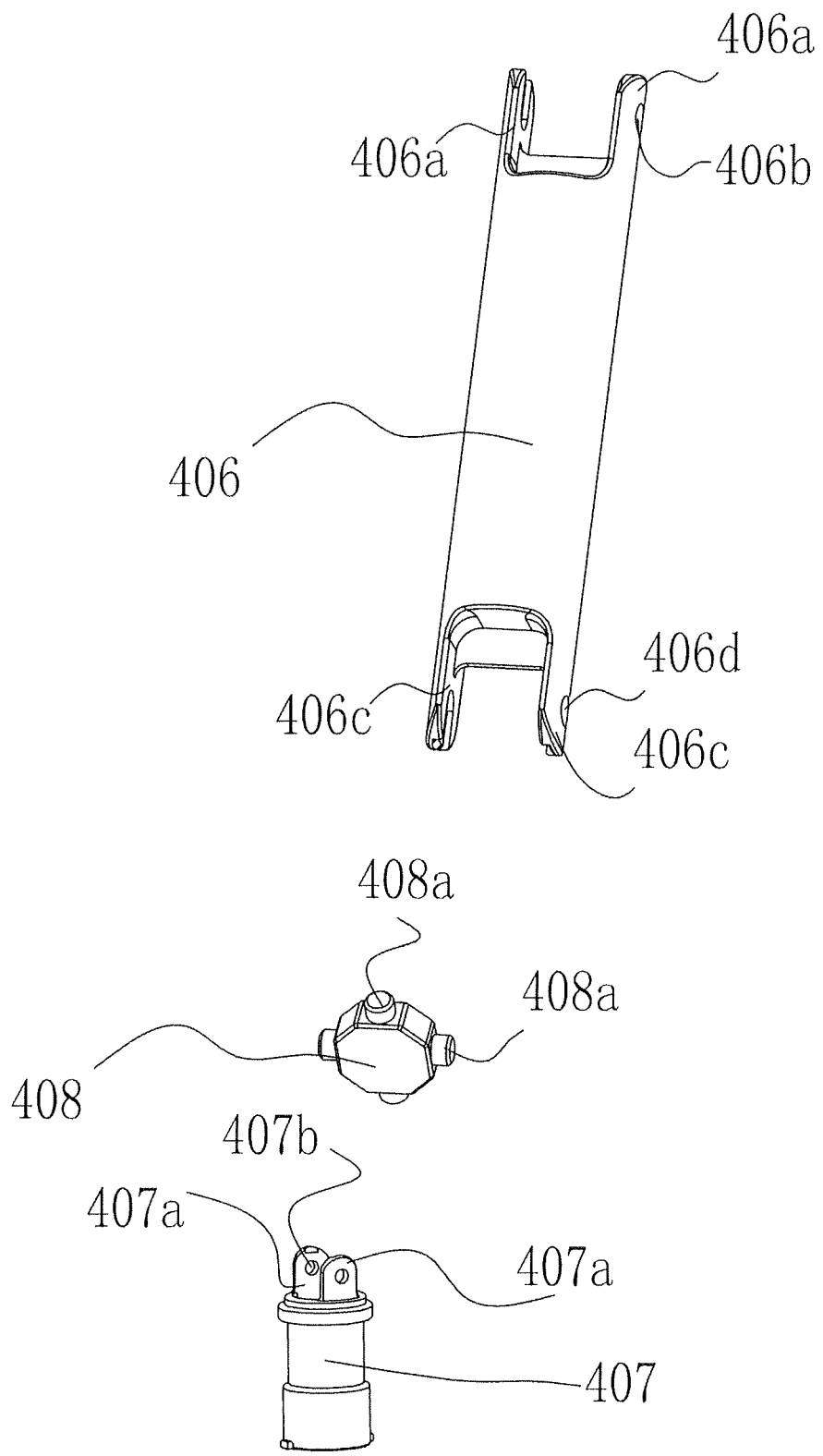
FIG. 8 is a perspective structural view of the middle connecting section, the cross member and the lower connecting section of the valve opening/closing device in FIG. 2.

FIG. 8 illustrates a schematic view of the structure of the lower connecting section 407, and of the connection between the lower connecting section and the middle connecting section 406. As shown in FIG. 8, one end of the lower connecting section 407 is provided with connecting ears 407a which are rigid axially and elastic radially and connecting holes 407b on the connecting ears. The middle connecting section 406 is also connected to lower connecting section 407 through another cross member 408. That is, two opposing shafts of the cross member 408 are snapped into two respective connecting holes 406d of the middle connecting section 406, while the other two opposing cross member shafts are snapped into the two respective connecting holes 407b on one end of the lower connecting section 407, so as to achieve the connection between the middle connecting section 406 and the lower connecting section 407. When installed, the upper connecting section 405, the middle connecting section 406 and the lower connecting section 407 constitute a universal mechanism, so that even when the upper connecting section 405 and the lower connecting section 407 are not in the same axis (i.e. the central rotating axis of the handle and the central rotating axis of the lower connecting section 407 do not coincide), the force acting on the handle can also be transferred through the connecting tube and the lower connecting section, so as to achieve the purpose of opening/closing the valve synchronously (that is, the valve stem is rotated by a same angle as that of the handle rotated).

Figure 9:
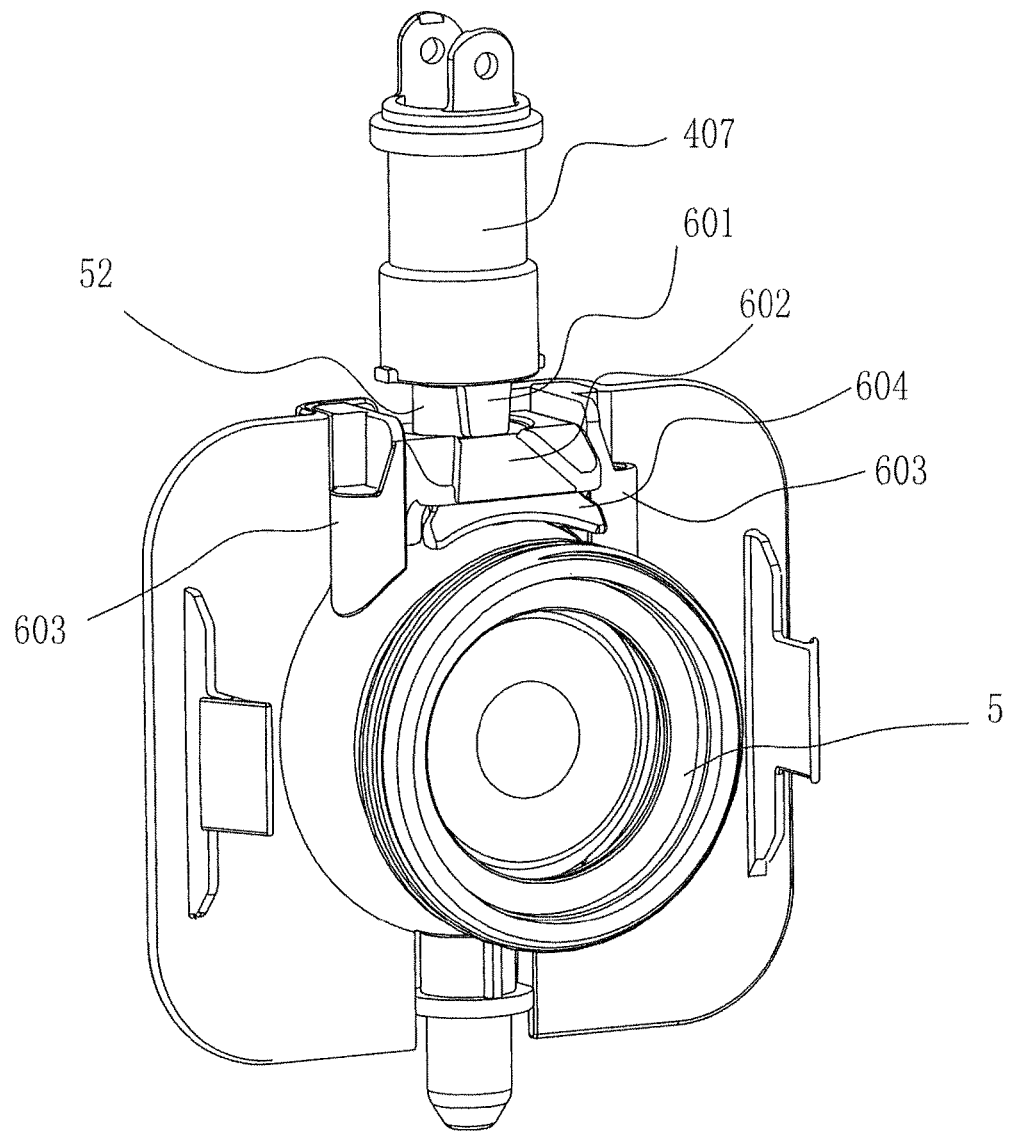
FIG. 9 is a perspective structural view of the lower connecting section, the clutch device and the valve of the valve opening/closing device in FIG. 2.

FIG. 9 shows the connection among the lower connecting section 407, the clutch device and the valve 5, wherein the clutch device and the valve are in a connected state. As shown FIG. 9, when the clutch device and the valve are in the connected state, the lower connecting section 407 is connected to the clutch rod 601 and the "⋅"-shaped connecting head of the clutch rod 601 is inserted into the valve stem 5 of the valve 5, whereby when the rotation of the lower connecting section 407 drives the clutch rod 601 to rotate, the clutch rod 601 drives the valve stem 52 to rotate, so as to achieve the opening/closing of the valve. The combined action of the clutch bracket 603, the control member 604 and the valve cover realizes the connection and disconnection between the clutch rod 601 and the valve stem 52, which will be further described hereinafter.

Figure 10A:
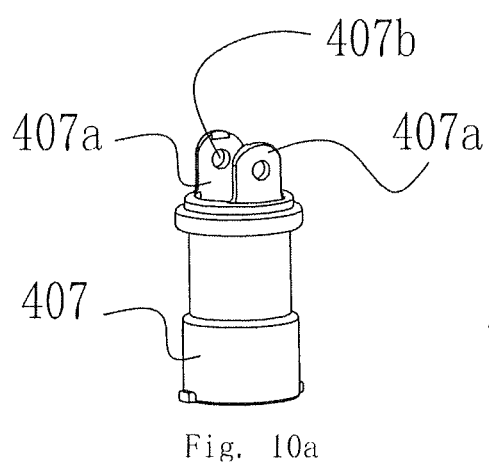
Figure 10B:
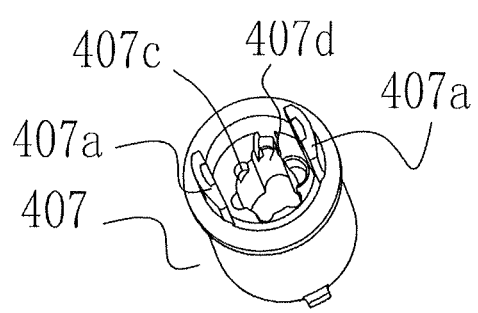
Figure 10C:
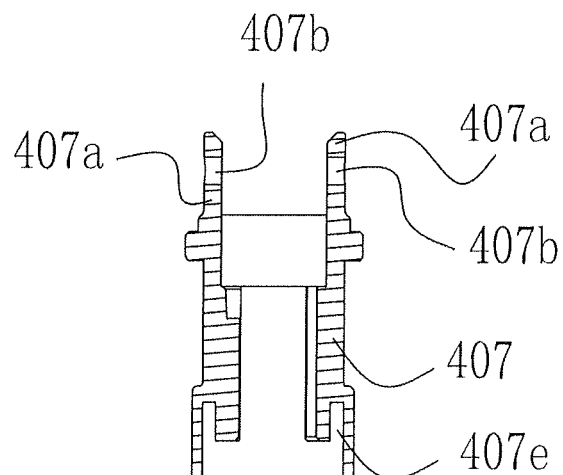
Figure 18:
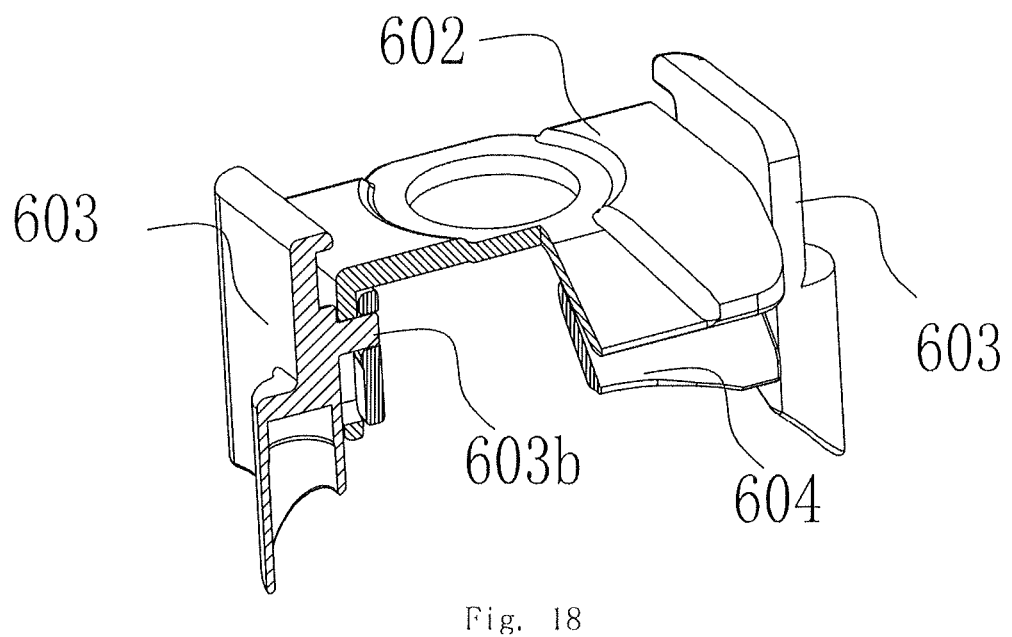
FIG. 18 illustrates a perspective structural view of the clutch bracket, clutch lifting platform and the control member of the valve opening/closing device which are assembled according to the first embodiment of the present invention, which is partially cut away to illustrate internal structure.

FIGS. 10a-10c illustrate the structure of the lower connecting section 407 in the present embodiment. As shown in FIGS. 10a-10c, the lower connecting section 407 is substantially a cylinder. Two connecting ears 407a extend from the upper part of the cylinder, and the connecting ears are provided with connecting holes 407b. A spline groove 407c used to receive the spline on the clutch rod 601 and a spline channel 407d used for the passage of the spline on the clutch rod 601 are provided inside the cylinder near the top of the cylinder. A groove 407e used to receive the restoring spring 605 (as shown in FIG. 18) is further provided inside the cylinder near the lower part of the cylinder.

Figure 11A:
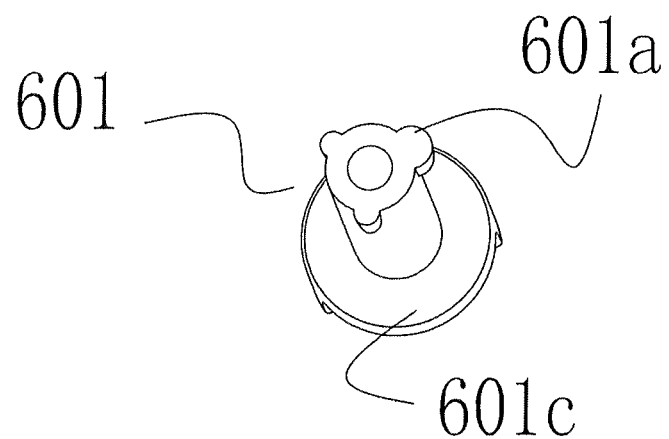
FIGS. 11a-11b illustrate structural perspective views of the clutch rod of the valve opening/closing device according to the first embodiment of the present invention.
Figure 11B:
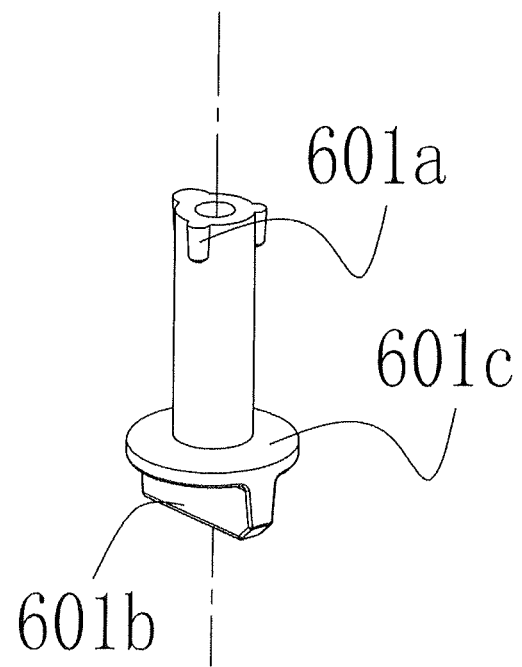

FIGS. 11a-11b illustrate the perspective views of the clutch rod 601 of the present embodiment. As shown in FIGS. 11a-11b, the clutch rod 601 comprises a base 601c, a cylinder extending from one end of the base 601c, and splines 601a extending from the end of the cylinder, wherein the number and the shape pf the splines 601a can be designed as needed. In the present embodiment, there are three splines. A "—"-shaped connecting head 601b is extending from the other end of the base 601c, so as to be engaged with the "⋅"-shaped connecting slot on the valve stem 52.

Figure 12:
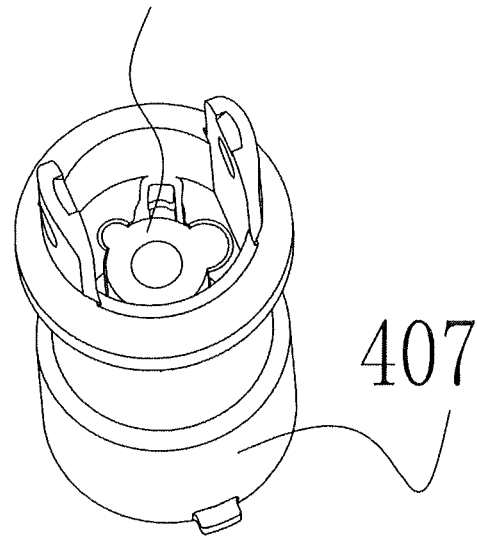
FIG. 12 illustrates a perspective view of the valve opening/closing device according to the first embodiment of the present invention, wherein the clutch rod and the lower connecting section are connected to each other.
Figure 13:
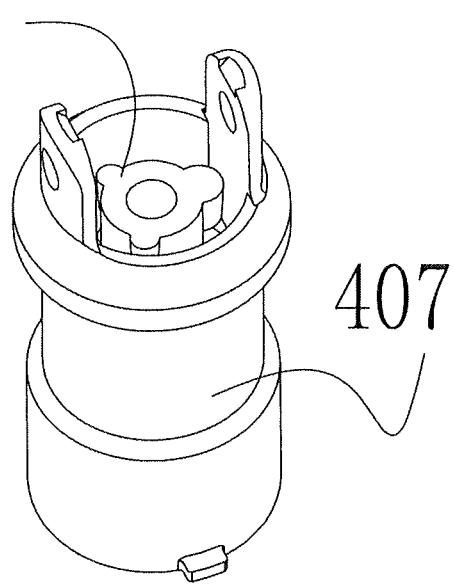
FIG. 13 illustrates a perspective view of the valve opening/closing device according to the first embodiment of the present invention, wherein the clutch rod and the lower connecting section are disconnected to each other.

FIGS. 12 and 13 illustrate the lower connecting section 407 and the clutch rod 601 in an installed state. Wherein, FIG. 12 illustrates the connection between the lower connecting section 407 and the clutch rod 601 when the clutch device is in a connected state. FIG. 13 illustrates the disconnection of the lower connecting section 407 from the clutch rod 601 when the clutch device is in a disconnected state.

Figure 14A:
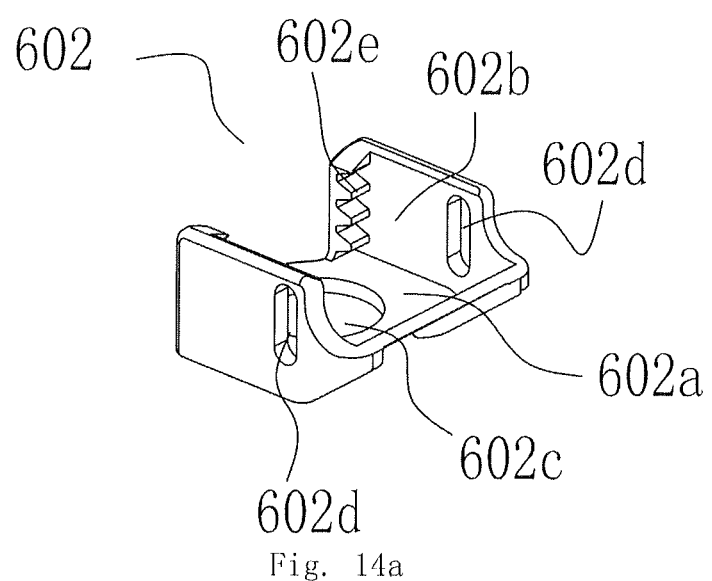
FIGS. 14a-14b illustrate perspective views of a clutch lifting platform of the valve opening/closing device according to the first embodiment of the present invention.
Figure 14B:
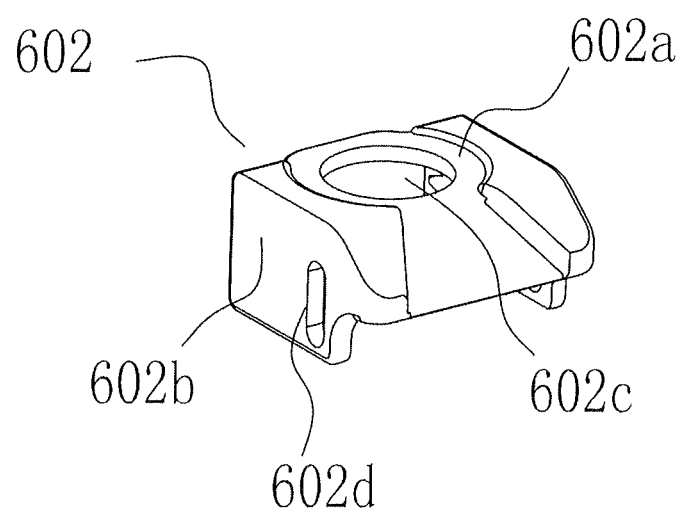

FIGS. 14a-14b illustrate perspective structural views of the clutch lifting platform 602 of the present embodiment. As shown in these figures, the clutch lifting platform 602 comprises a bottom plate 602a and two side plates 602b extending upward from both sides of the bottom plate 602a. A through-hole 602c used for the passage of the valve stem 53 of the valve 5 is provided at the center of the bottom plate 602a. Lifting limiting slots 602d are provided at the sidewalls 602b. Racks 602e are further provided at one end of each sidewall. Racks 602e are used to be engaged with gears 604d of the control member 604, so as to realize the ascending/descending of the clutch lifting platform 602, which will be further described hereinafter.

Figure 15:
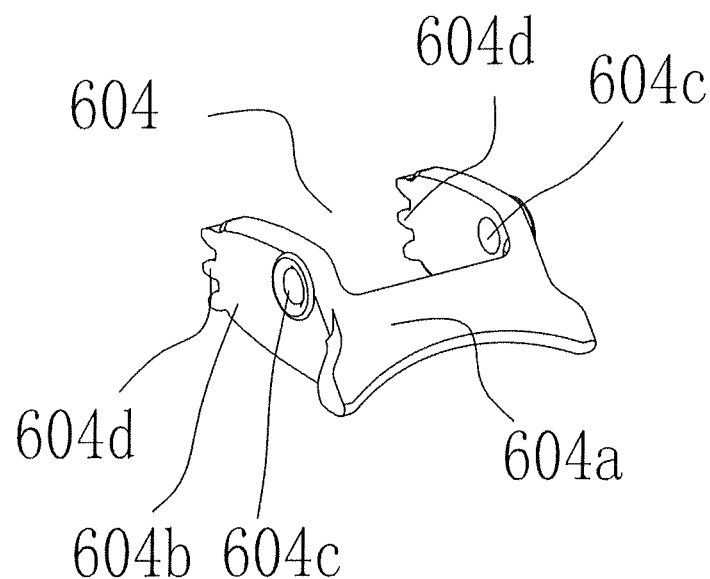
FIG. 15 illustrates a perspective view of a control member of the valve opening/closing device according to the first embodiment of the present invention.

FIG. 15 shows a structural perspective view of the control member 604. As shown in FIG. 15, the control member 604 comprises a press-plate 604a, two arms 604b extending from both ends of the press-plate 604a. The arms 604b are provided with rotating holes 604c and gears 604d are provided at the ends of the arms 604b. Gears 604d are engaged with the racks of the clutch lifting platform 602, so as to realize the ascending/descending of the clutch lifting platform 602.

Figure 16:
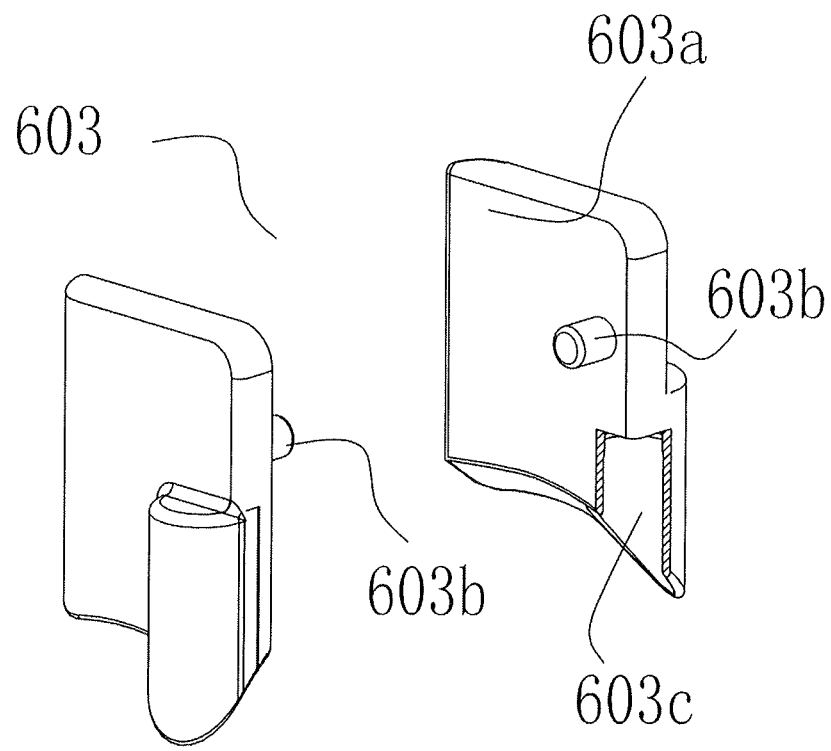
FIG. 16 illustrates a perspective view of a clutch bracket of the valve opening/closing device according to the first embodiment of the present invention.

FIG. 16 shows a perspective structural view of the clutch bracket 603. As shown in FIG. 16, the clutch bracket 603 consists of two identical brackets. Each bracket 603 includes a bracket body 603a, a rotating pin 603b extending from one side of the bracket body 603a, and a positioning hole 603c used to secure the bracket to the valve 5. Bracket body 603a is a plate-shaped member and the rotating pin 603b is a cylindrical pin. It should be noted that the structure of the clutch bracket is not particularly limited as long as it is provided with rotating pins.

Figure 17:
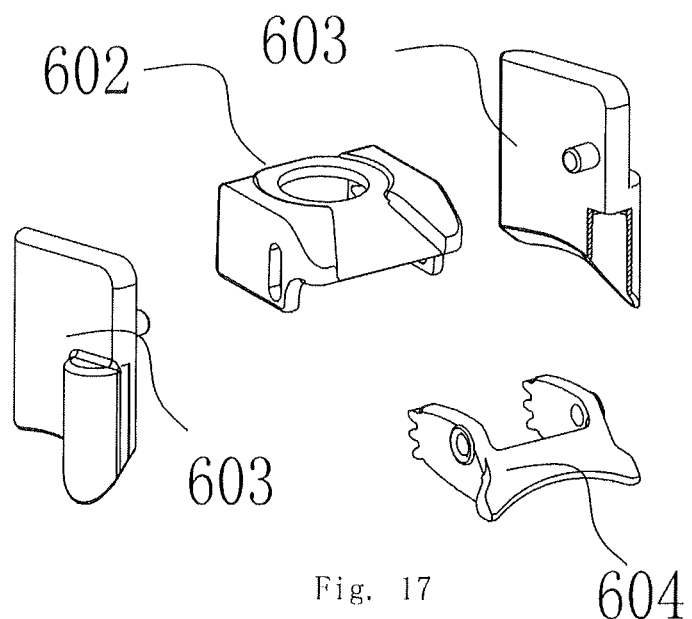
FIG. 17 illustrates the relative positions among the clutch bracket, the clutch lifting platform and the control member of the valve opening/closing device according to the first embodiment of the present invention.

FIG. 17 illustrates relative positions among the clutch bracket 603, the clutch lifting platform 602 and the control member 604. FIG. 18 illustrates the structural view of the clutch bracket 603, the clutch lifting platform 602 and the control member 604 when assembled, which is partially cut away to illustrate internal structure. As shown in FIGS. 17 and 18, when assembling, the rotating pins 603b on the clutch brackets 603e are firstly inserted into lifting limiting slots 602d of the clutch lifting platform 602, then inserted into the rotating holes 604c of the control member 604, wherein the control member 604 is located innermost. At the same time, the gears 604d on the control member 604 are engaged with the racks 602e on the clutch lifting platform 602. When pressing down the press-plate 604a of the control member 604, the clutch lifting platform 602 will be upraised due to the engagement of the gears 604 and racks 602e, thereby the clutch rod 601 is also upraised, so that the clutch rod 601 is disconnected from the lower connecting section 407, which will be further described hereinafter.

FIG. 19 shows a perspective structural view of the valve stem 52 of the present embodiment. As shown in FIG. 19, the head of the valve stem 52 is provided with a "—"-shaped connecting slot, which is used to be engaged with the "—"-shaped connecting head 601 of the clutch rod 601, so as to achieve the opening/closing of the valve. The end of the valve stem 52 is provided with a spline used to be engaged with the valve core. It should be noted that the shape of the connecting slot on the head of the valve stem 52 can be appropriately designed according to the shape of the connecting head of the clutch rod 601. For example, when the connecting head of the clutch rod 601 is a cross, the connecting slot is also a cross. Further, the structure provided on the end of the valve stem 52 and used to be connected to the valve core, can also be appropriately designed according to the structure of the valve core.

FIGS. 20a-20b show perspective structural views of the cover 51 of the valve 5. The cover 51 is provided with a handle portion 51a at one end and a circle of projection 51b located at the other end. Internal thread 51c is provided inside the cover 51, and the internal thread 51c is engaged with the external thread on the mouth portion of the valve 5, so that the cover 51 can be screwed onto the valve 5.

FIGS. 21-24 show sectional views of the valve opening/closing device and the clutch device when installed, wherein part of the structure is not shown for clarity. As shown in FIGS. 21-24, when assembled, the clutch bracket is fixed to the valve seat through threaded connection or snapping connection. The control member 604 and the clutch lifting platform 602 are installed on the rotating pins 603b of the clutch bracket 603, so that the control member 604 can rotate about the rotating pins 603b, and the clutch lifting platform can move up and down along the rotating pins 603b. At the same time, the gears 604d of the control member 604 are engaged with the racks 602e of the clutch lifting platform 602. The valve stem 52 of the valve 5 passes through the through-hole 602c of the clutch lifting platform 602, and the upper surface of the clutch lifting platform 602 contacts with the bottom surface of the connecting head 601b of the clutch rod 601. The restoring spring 605 is received in the groove 407e of the lower connecting section 407, and one end thereof contacts the upper surface of the base 601c of the clutch rod 601. In the connected state, the connecting head 601b of the clutch rod 601 can be pressed into the connecting slot of the valve stem by the restoring spring 605.

Figure 21:
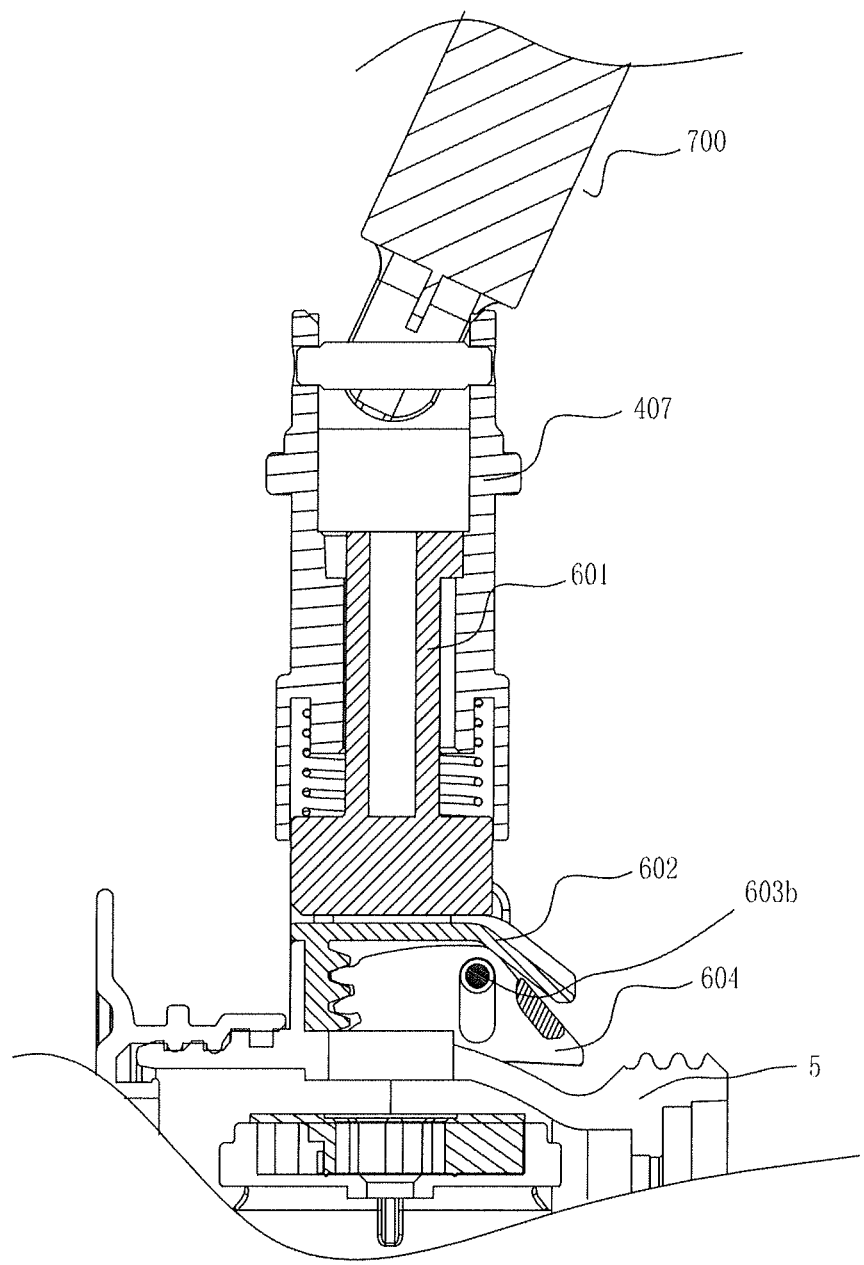
FIGS. 21 and 23 illustrate sectional views of the valve opening/closing device according to the first embodiment of the present invention, wherein the clutch device is in a connected state.
Figure 23:
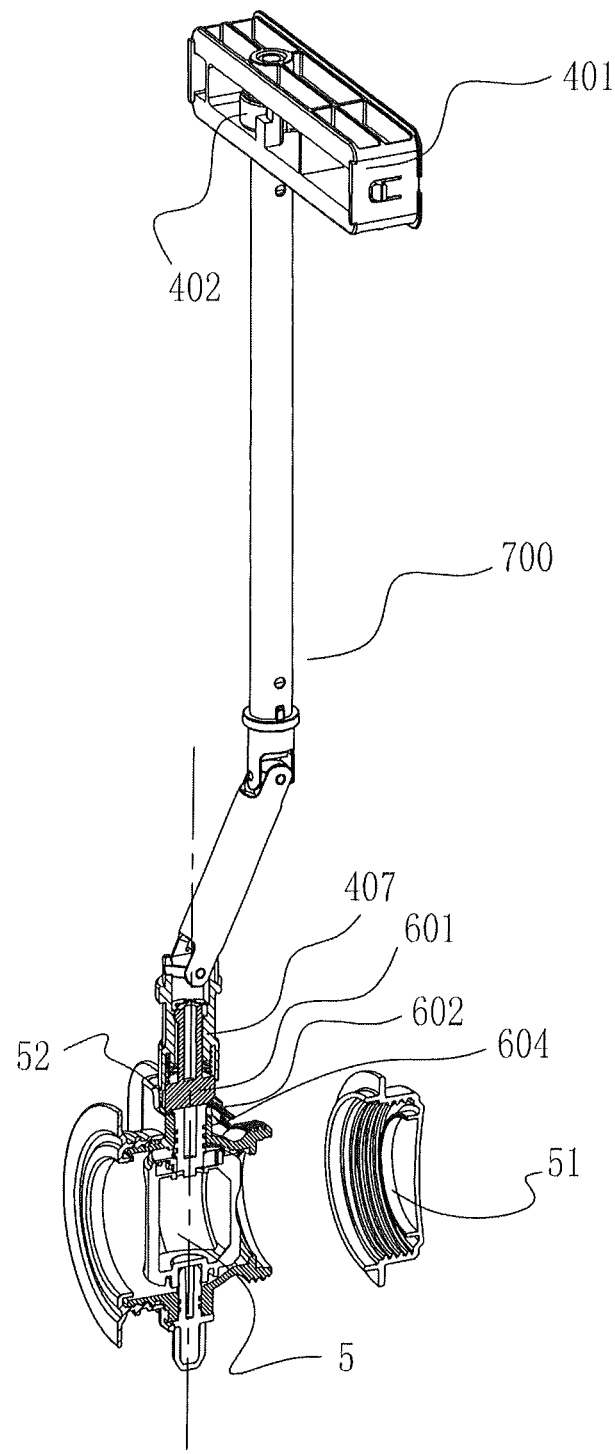

FIGS. 21 and 23 illustrate the valve opening/closing device in a connected state. As shown in FIGS. 21 and 23, in the connected state, the spline 601a of the clutch rod 601 is located in the spline groove 407c of the lower connecting section 407, thus the clutch rod 601 can rotate along with the rotation of the lower connecting section 407. The connecting head 601b of the clutch rod 601 is engaged with the connecting slot 52a of the valve stem 52, i.e. the motion-transferring device 700 is engaged with the valve stem 52, so that the rotation of the clutch rod 601 will drive the rotation of the valve stem 52, thereby driving the rotation of the valve core of the valve 5 connected to the valve stem 52, so as to realize the opening and closing of the valve.

Figure 22:
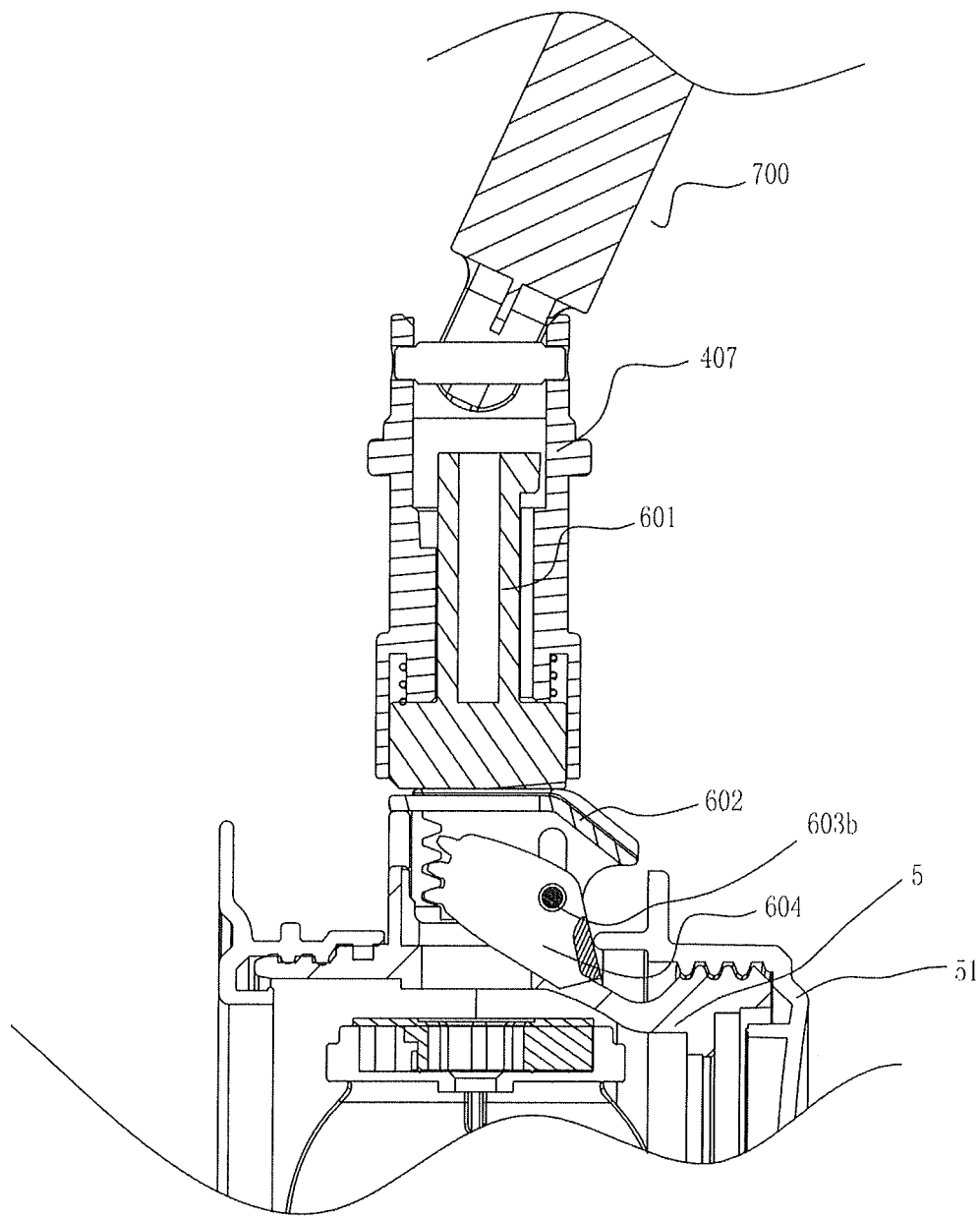
FIGS. 22 and 24 illustrate sectional views of the valve opening/closing device according to the first embodiment of the present invention, wherein the clutch device is in a disconnected state.
Figure 24:
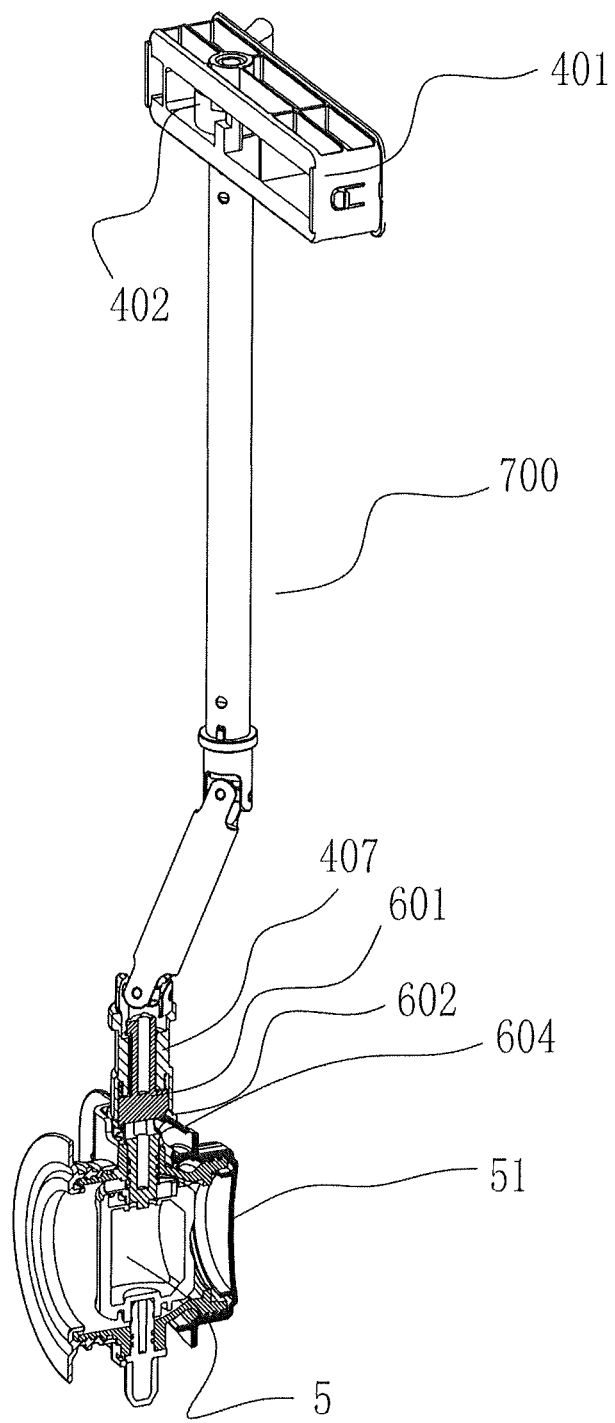

FIGS. 22 and 24 show the valve opening/closing device in a disconnected state. As shown in FIGS. 22 and 24, with the cover screwed on the valve 5, the inward projecting projection 51b of the cover 51 contacts the control member 604 and presses the control member 604 so that the control member 604 rotates about the rotating pins 603b of the clutch bracket 603. At the same time, the clutch lifting platform 602 moves up under the engagement of the gears with the racks, thereby gradually pushing the clutch rod 601 upward. When the cover 51 is screwed tightly, the spline 601a of the clutch rod 601 will be disengaged from the spline groove 407c of the lower connecting section 407, so that the clutch rod 601 is disengaged from the lower connecting section 407, i.e. the motion-transferring device 700 is disengaged from the valve stem 52. Thus, any action acting on the handle 402 cannot be transferred to the valve stem 52 through the valve opening/closing motion-transferring device, and no matter how the handle 402 moves, the valve will not be opened, thereby achieving the mistakenly-opening preventing function.

Conversely, when the valve cover 51 is screwed off, the spline 601a of the clutch rod 601 will fall into the spline groove 407c of the lower connecting section 407. Thereby, actions acting on the handle 402 can be transferred to the valve stem through the motion-transferring device, so as to achieve the opening/closing of the valve.

Figure 25:
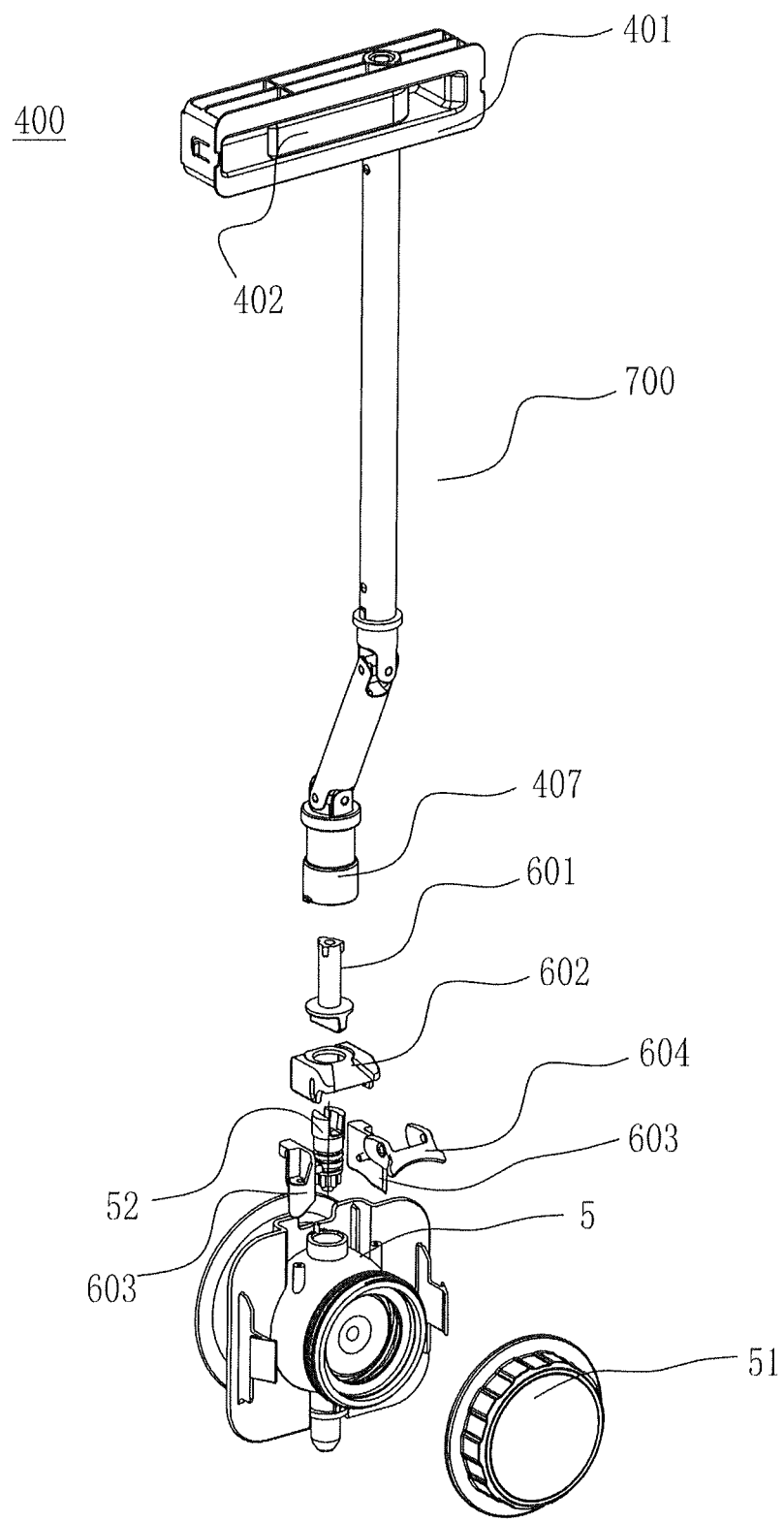
FIG. 25 illustrates a exploded perspective structural view of the valve opening/closing device according to the second embodiment of the present invention.

FIGS. 25 to 29 show a second embodiment of the present invention. As shown in FIG. 25, the valve opening/closing device 400 comprises a handle fixing base 401, a handle 402, a valve motion-transferring device 700, a valve opening/closing mechanism, and an mistakenly-opening preventing device 600. Wherein, the valve opening/closing mechanism is a valve stem connected to the valve core of the valve. The mistakenly-opening preventing device 600 is a clutch device, wherein the clutch device 600 comprises a clutch rod 601, a clutch lifting platform 602, a clutch bracket 603, a control member 604, and a valve cover 51. Wherein, the clutch rod 601, the clutch lifting platform 602, the clutch bracket 603, and the control member 604 constitute a clutch mechanism. The valve cover 51 is a driving mechanism used to drive the clutch mechanism. The clutch lifting platform 602 can move up and down under the interaction between the control member 604 and the valve cover 51 so as to achieve the connection and disconnection between the clutch rod 601 and the valve stem 52, which will be described in more detail hereinafter.

In this embodiment, the difference from the first embodiment is that the structures of the clutch lifting platform 602 and the control member 604 are changed, the structures of the rest components and the engaging relationships thereof are the same, which will not be described in detail again here.

FIGS. 26a-26b illustrate perspective structural views of the clutch lifting platform 602 according to the present embodiment. As shown in these figures, the clutch lifting platform 602 comprises a bottom plate 602a and two sidewalls 602b extending upward from both sides of the bottom plate 602a. A through-hole 602c used for the passage of the valve stem 52 of the valve 5 is provided at the center of the bottom plate 602a. Lifting limiting slots 602d are provided at the sidewalls 602b. When installed, the lower surface of the bottom plate 602a can directly contact the cams of the control member 604 so as to realize the ascending/descending of the clutch lifting platform 602, which will be further described hereinafter.

FIG. 27 shows a perspective structural view of the control member 604 according to the second embodiment. As shown in FIG. 27, the control member 604 comprises a press-plate 604a, two arms 604b extending from both ends of the press-plate 604a, rotating holes 604c provided on the arms 604b and cams 604e provided at the ends of the arms 604b. Cams 604e directly contact with the lower surface of the bottom plate 602a of the clutch lifting platform 602, so that the clutch lifting platform 602 will ascend or descend under the effect of the cams 604e.

Figure 28:
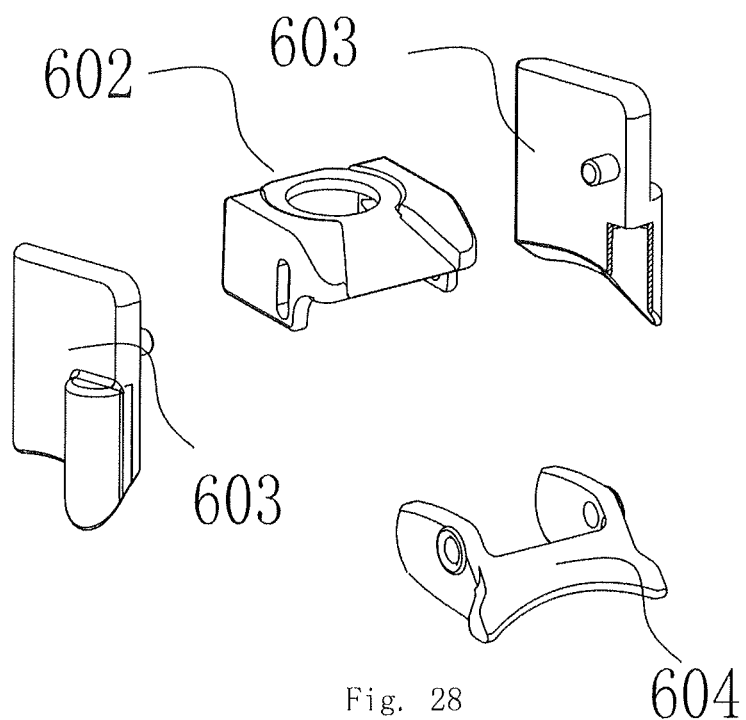
FIG. 28 illustrates relative positions among the clutch bracket, the clutch lifting platform and the control member of the valve opening/closing device according to the second embodiment of the present invention.
Figure 29:
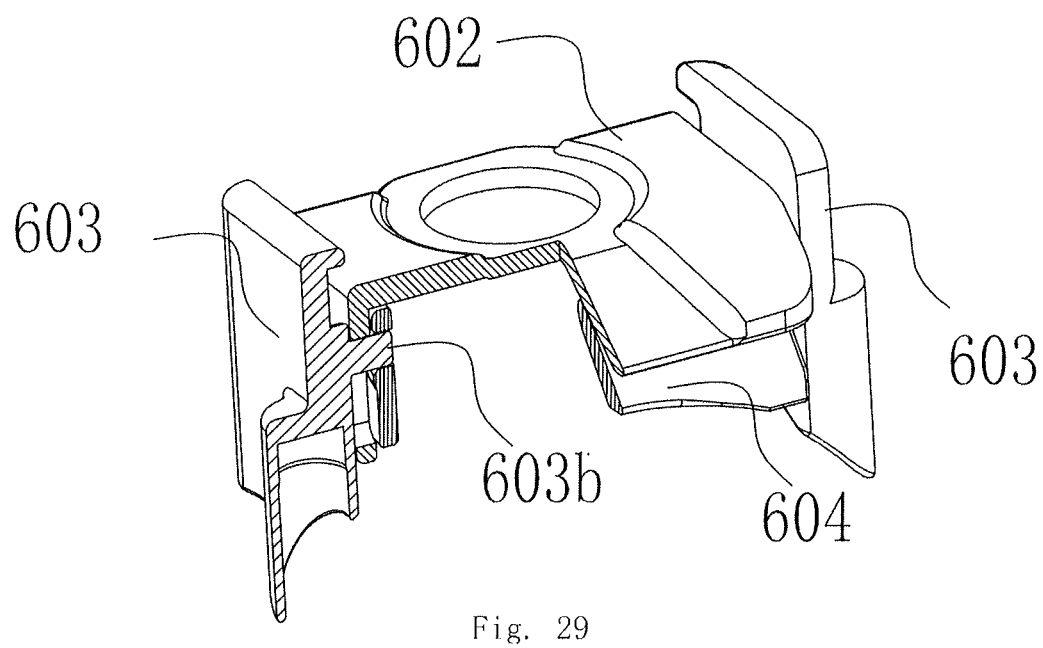
FIG. 29 illustrates a perspective structural view of the clutch bracket, the clutch lifting platform and the control member of the valve opening/closing device which are assembled according to the second embodiment of the present invention, which is partially cut away to illustrate internal structure.

FIG. 28 illustrates relative positions among the clutch bracket 603, the clutch lifting platform 602 and the control member 604. FIG. 29 illustrates the structural view of the clutch bracket 603, the clutch lifting platform 602 and the control member 604 when assembled, which is partially cut away to illustrate internal structure. As shown in FIGS. 28 and 29, when assembling, the rotating pins 603b of the clutch bracket 603 are firstly inserted into lifting limiting slots 602d of the clutch lifting platform 602, then inserted into the rotating holes 604c of the control member 604, wherein the control member 604 is located innermost. At the same time, the cams 604e of the control member 604 directly contact with the bottom plate of the clutch lifting platform 602. When pressing down the pressplate 604a of the control member 604, the clutch lifting platform 602 will be upraised due to the effect of the cams 604e, and thereby the clutch rod 601 is also upraised, so that the clutch rod 601 is disconnected from the lower connecting section 407, which will be further described hereinafter.

Figure 30:
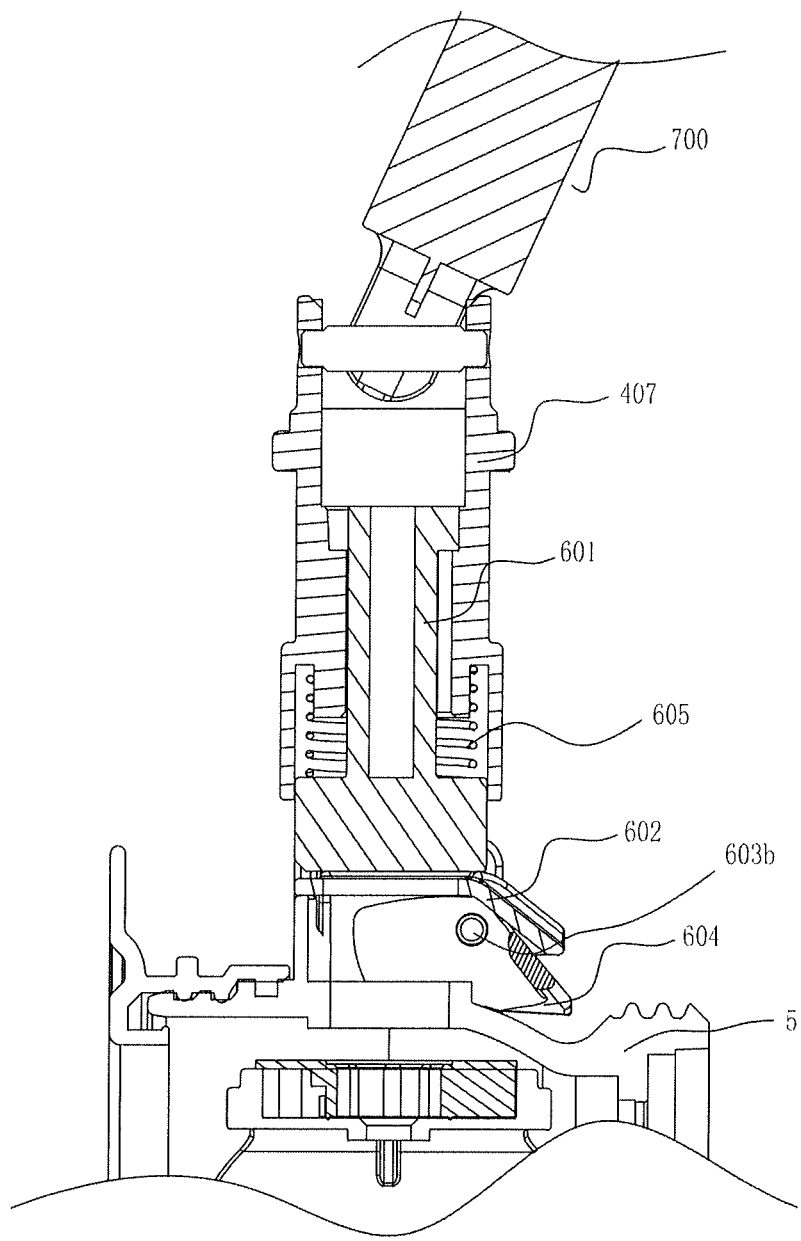
FIG. 30 illustrates a sectional view of the valve opening/closing device according to the second embodiment of the present invention, wherein the clutch device is in a connected state.
Figure 31:
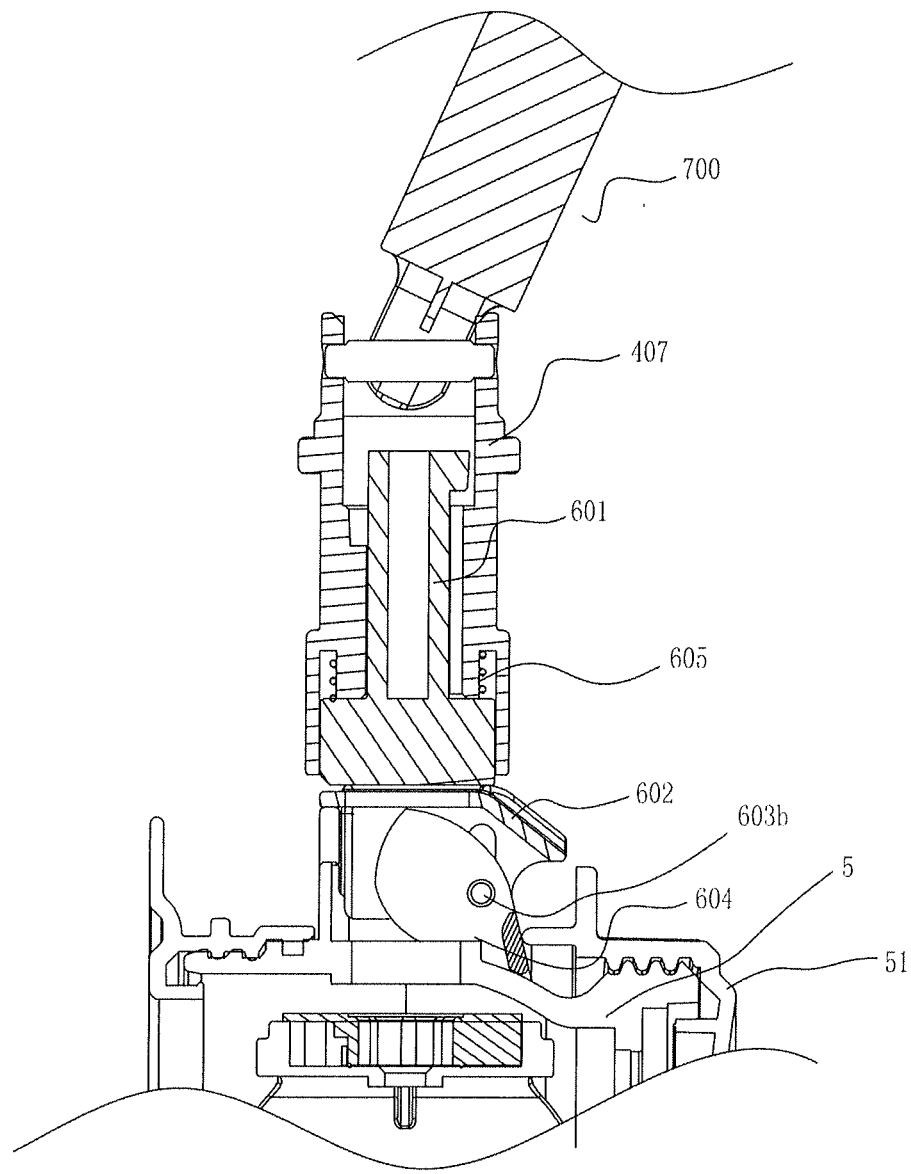
FIG. 31 illustrates a sectional view of the valve opening/closing device according to the second embodiment of the present invention, wherein the clutch device is in a disconnected state.

FIGS. 30-31 show sectional views of the valve opening/closing device and the clutch device after the completion of installation, and for clarity, part of the structure is not shown. As shown in FIGS. 30-31, When assembled, the clutch bracket is fixed to the valve seat through threaded connection or snapping connection. The control member 604 and the clutch lifting platform 602 are installed on the rotating pins 603b of the clutch bracket 603, so that the control member 604 can rotate about the rotating pins 603b, and the clutch lifting platform can move up and down along the rotating pins 603b. At the same time, the cams 604e of the control member 604 directly contact the bottom plate 602a of the clutch lifting platform 602. The valve stem 52 of the valve 5 passes through the through-hole 602c of the clutch lifting platform 602, and the upper surface of the clutch lifting platform 602 contacts the bottom surface of the connecting head 601b of the clutch rod 601. The restoring spring 605 is received in the groove 407e of the lower connecting section 407, and one end thereof contacts the upper face of the base 601c of the clutch rod 601. In the connected state, the connecting head 601b of the clutch rod 601 can be pressed into the connecting slot 52a of the valve stem 52 by the restoring spring 605.

FIG. 30 illustrates the valve opening/closing device in a connected state according to the second embodiment of the present invention. As shown in FIG. 30, in the connected state, the spline 601a of the clutch rod 601 is located in the spline groove 407c of the lower connecting section 407, i.e. the motion-transferring device 700 is connected to the valve stem 52, thus the clutch rod 601 can rotate along with the rotation of the lower connecting section 407. The connecting head 601b of the clutch rod 601 is engaged with the connecting slot 52a of the valve stem 52, so that the rotation of the clutch rod 601 will drive the rotation of the valve stem 52, thereby driving the rotation of the valve core of the valve 5 connecting to the valve stem 52, so as to realize the opening and closing of the valve.

FIG. 31 shows the valve opening/closing device in a disconnected state according to the second embodiment of the present invention. As shown in FIG. 31, with the cover screwed on the valve 5, the inward projecting projection 51b of the cover 51 contacts the control member 604 and presses the control member 604 so that the control member 604 rotates about the rotating pins 603b of the clutch bracket 603. At the same time, the clutch lifting platform 602 moves up under the action of the cams 604e of the control member 604, thereby gradually pushing the clutch rod 601 upward. When the cover 51 is screwed tightly, the spline 601a of the clutch rod 601 will be disengaged from the spline groove 407c of the lower connecting section 407, so that the clutch rod 601 id disengaged from the lower connecting section 407, i.e. the motion-transferring device 700 is disengaged from the valve stem 52. Thus, any action acting on the handle 402 cannot be transferred to the valve stem 52 through the valve opening/closing motion-transferring device, and no matter how the handle 402 moves, the valve will not be opened, thereby achieving the mistakenly-opening preventing function.

Conversely, when the valve cover 51 is screwed off, the spline 601a of the clutch rod 601 will fall into the spline groove 407c of the lower connecting section 407. Thereby, actions acting on the handle 402 can be transferred to the valve stem through the motion-transferring device, so as to achieve the opening/closing of the valve.

Figure 32:
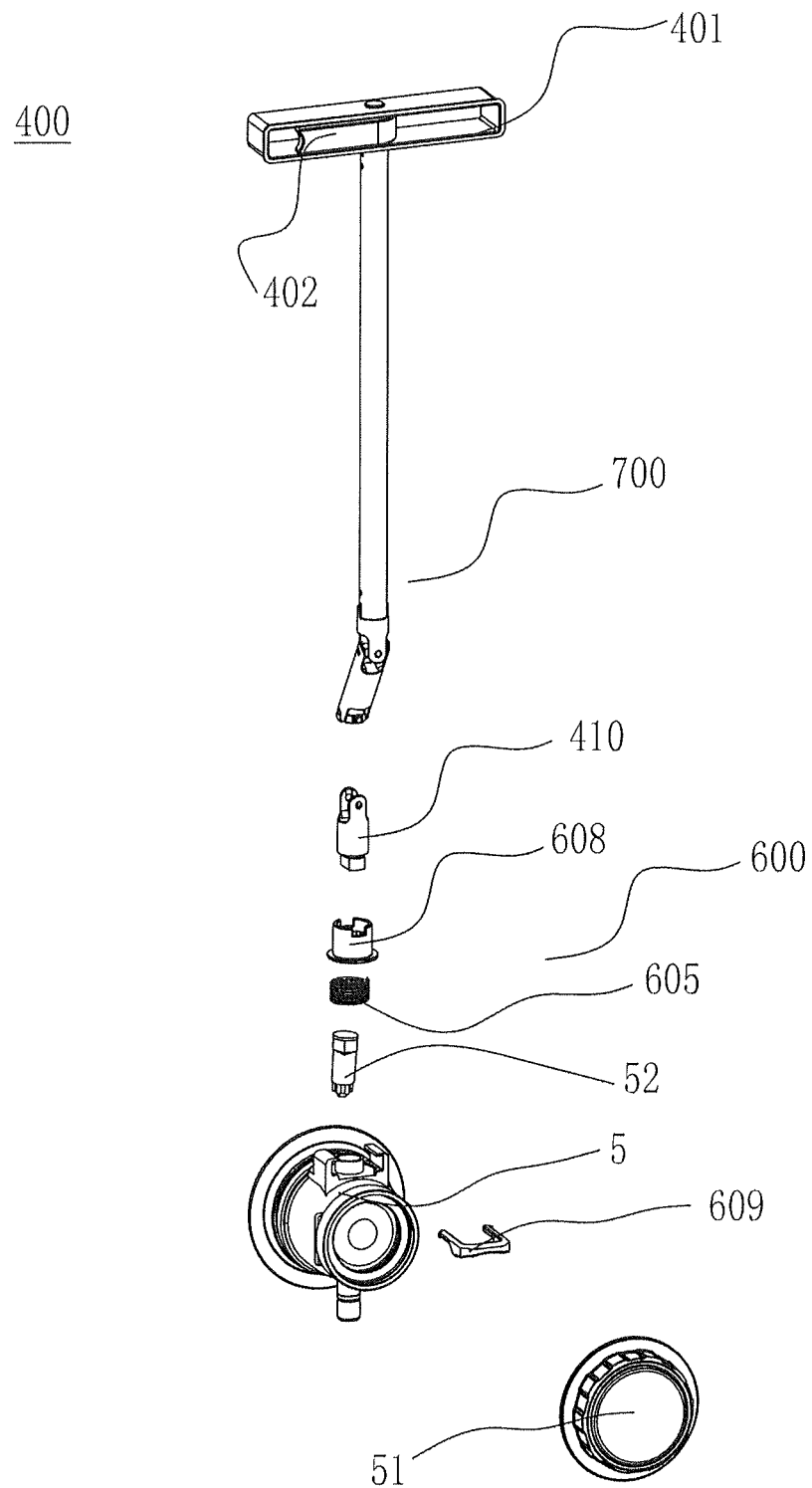
FIG. 32 illustrates a exploded perspective structural view of the valve opening/closing device according to the third embodiment of the present invention.
Figure 33:
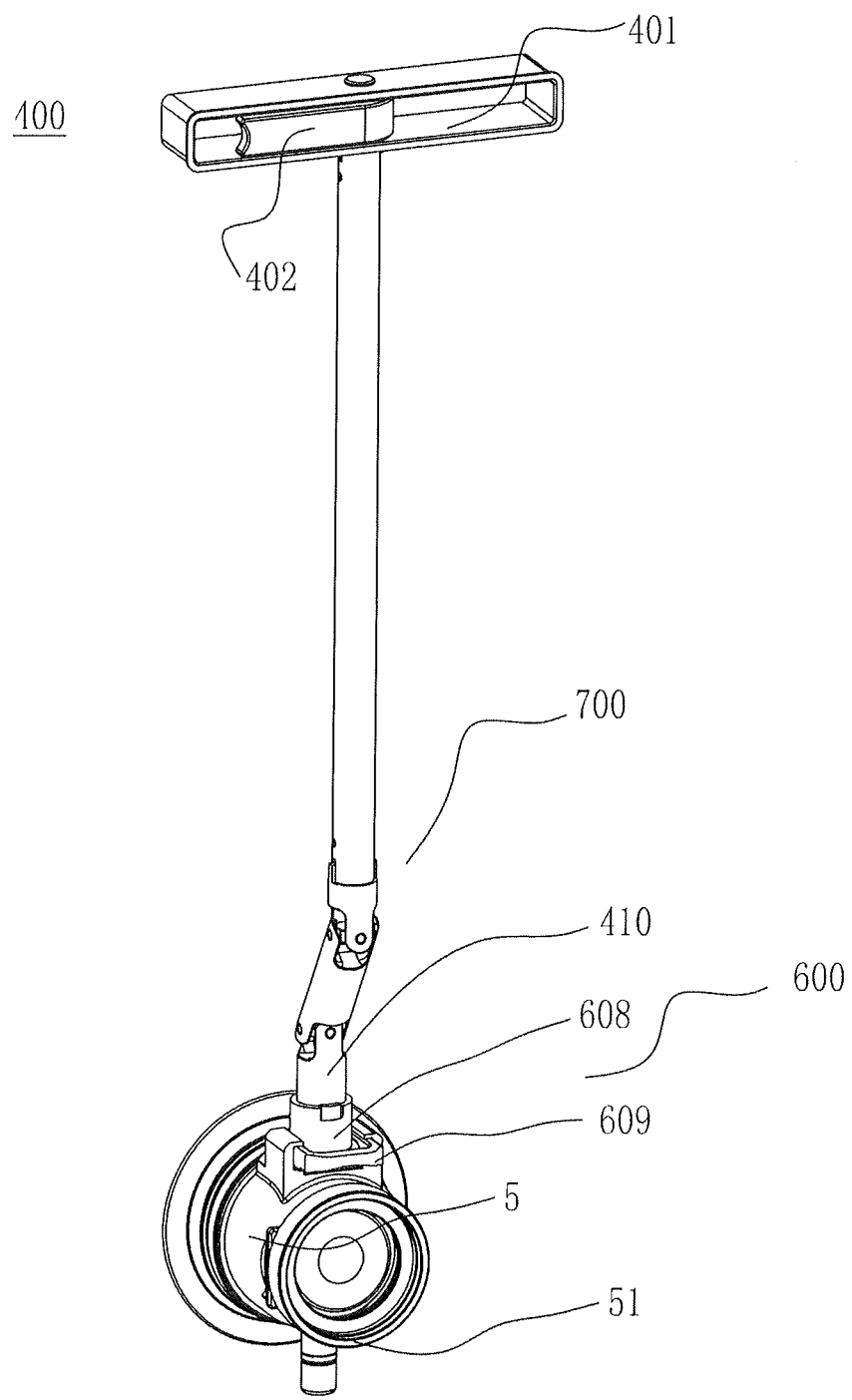
FIG. 33 illustrates a perspective structural view of the assembled valve opening/closing device according to the third embodiment of the present invention.

FIGS. 32 to 43 show the valve opening/closing device 400 according to the third embodiment of the present invention. FIG. 32 illustrates an exploded perspective view of the valve opening/closing device 400, and FIG. 33 illustrates a perspective view of the valve opening/closing device 400 when assembled. As shown in FIGS. 32-33, the valve opening/closing device 400 comprises a handle fixing base 401, a handle 402, a valve motion-transferring device 700, a valve opening/closing mechanism, and an mistakenly-opening preventing device 600. The valve opening/closing mechanism is a valve stem. The mistakenly-opening preventing device 600 is a clutch device. The clutch device 600 comprises a clutch rod 601, a clutch lifting platform 602, a clutch bracket 603, a control member 604, and a valve cover 51. The clutch rod 601, the clutch lifting platform 602, the clutch bracket 603, and the control member 604 constitute a clutch mechanism, while the valve cover 51 is a driving mechanism used to drive the clutch mechanism. The clutch lifting platform 602 can move up and down under the interaction between the control member 604 and the valve cover 51, so as to achieve the connection and disconnection between the clutch rod 601 and the valve stem 52, which will be described in more detail hereinafter.

In the present embodiment, the difference from the first embodiment is that the structure of the lower connecting section 410 of the clutch motion-transferring device 700 and the structure of the clutch device 600 are changed. In this embodiment, the clutch device 600 only comprises a clutch lifting platform 608, a restoring spring 605, and a control member 609. The rest structures are the same, which will not be described in detail here.

Figure 34:
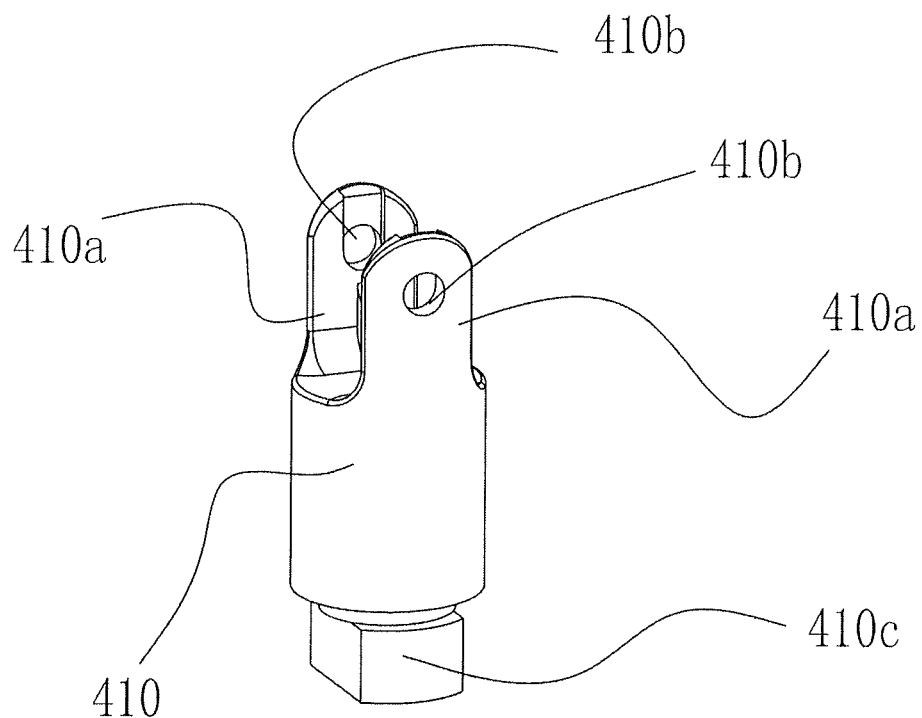
FIG. 34 illustrates a perspective structural view of the lower connecting section of the a motion-transferring device of the valve opening/closing device according to the third embodiment of the present invention.

FIG. 34 illustrates a structural schematic view of the lower connecting section 410 of the motion-transferring device according to the third embodiment of the present invention. As shown in FIG. 34, one end of the lower connecting section 410 is provided with connecting ears 410a which are rigid axially and elastic radially and connecting holes 410b provided in the connecting ears. The connecting holes are used to connect the lower connecting section to the middle connecting section 406 through a cross member. That is, two opposing shafts of the cross member are snapped into two respective connecting holes 406d of the middle connecting section 406, while the other two opposing shafts are snapped into the two respective connecting holes 410b in one end of the lower connecting section 410, so as to achieve the connection between the middle connecting section 406 and the lower connecting section 410. The other end of the lower connecting section 410 is provided with a connecting head used to be engaged with the clutch lifting platform 608. The connecting head is a " - "-shaped connecting head 410c, but can also be connecting heads of other shapes, such as spline and the like.

FIGS. 35-40 illustrate perspective structural views of components of the clutch device according to the third embodiment. As shown in FIGS. 35-40, the clutch device 600 comprises a clutch lifting platform 608, a restoring spring 605, and a control member 609. The clutch lifting platform 608 can move up and down under the interaction between the restoring spring 605 and the control member 609, which will be further described hereinafter.

Figure 35:
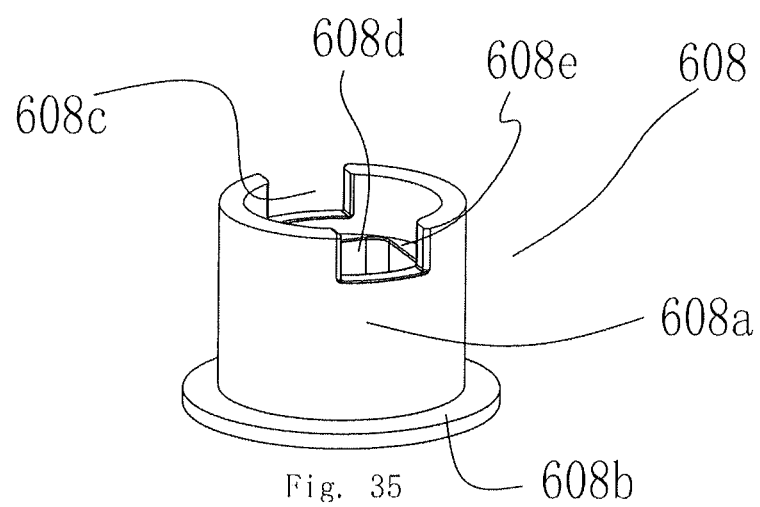
FIG. 35 illustrates a perspective structural view of the clutch lifting platform of the valve opening/closing device according to the third embodiment of the present invention.
Figure 37:
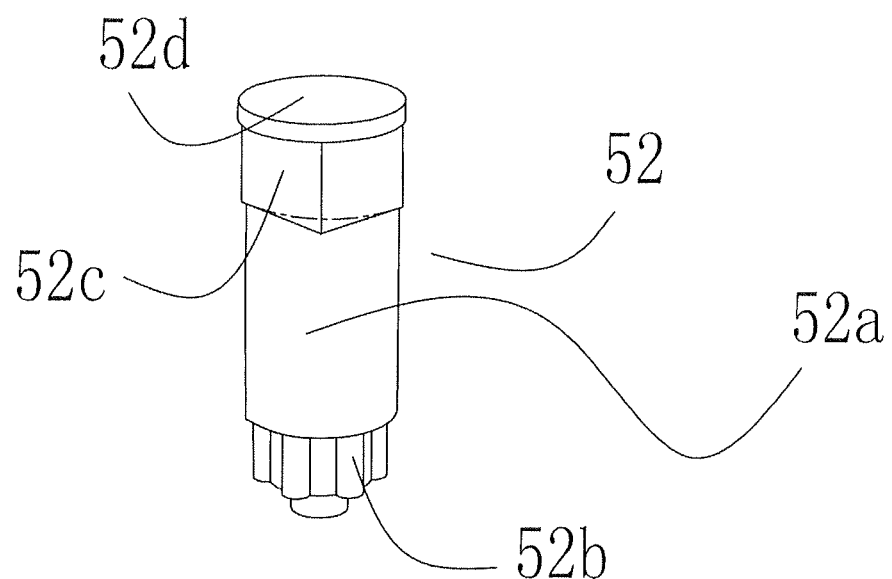
FIG. 37 illustrates a perspective structural view of a valve stem of the valve opening/closing device according to the third embodiment of the present invention.

FIG. 35 illustrates a perspective structural view of the clutch lifting platform 608. As shown in FIG. 35, the clutch lifting platform 608 comprises a cylindrical body 608a, wherein the lower end of the cylindrical body 608a is provided with a radial projection 608b, and the upper end thereof is provided with a "—"-shaped connecting slot 608c used to be engaged with the lower connecting section 410. The cylindrical body 608a is further provided with a positioning slot 608d used to be engaged with a positioning projection 52c (as shown in FIG. 37) on the valve stem 52, a position limiting table 608e used to be engaged with a limiting projection 52d (as shown in FIG. 37) provided on the valve stem 52, and a groove 608f used to receive the restoring spring 605. When installed, the upper surface of the projection 608b of the clutch lifting platform 608 can directly contact the lower surface of the control member 609, so as to achieve the ascending/descending of the clutch lifting platform 608, which will be further described hereinafter.

Figure 36:
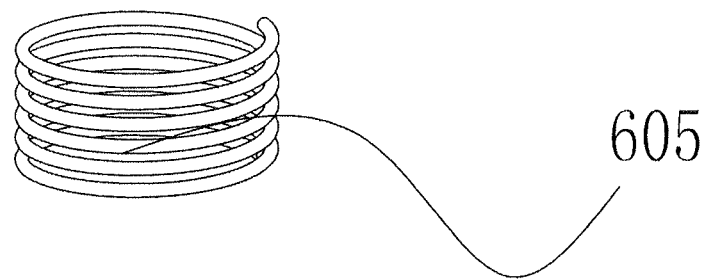
FIG. 36 illustrates a perspective structural view of a restoring spring of the valve opening/closing device according to the third embodiment of the present invention.
Figure 38:
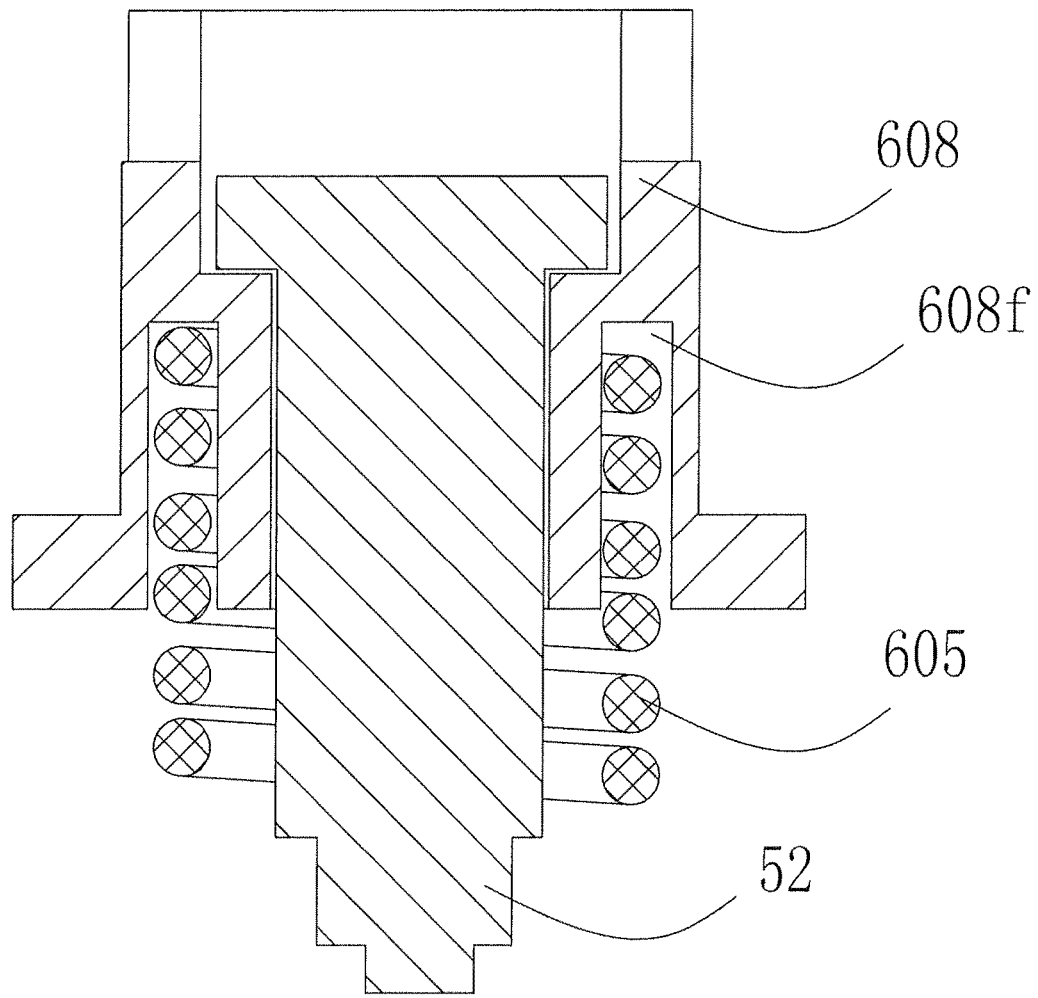
FIG. 38 illustrates a sectional view of the clutch lifting platform, the restoring spring and the valve stem of the valve opening/closing device which are assembled together according to the third embodiment of the present invention.

FIGS. 36 and 37 show perspective structural views of the restoring spring 605 and the valve stem 52 according to the third embodiment. As shown in FIG. 36, the restoring spring 605 is a coil spring, but may also be springs of other types that can provide elastic restoration. As shown in FIG. 37, the valve stem 52 includes a rod body 52a, and the lower end of the rod body is provided with a spline 52b used to be engaged with the valve core. The upper end of the rod body 52a is sequentially provided with a positioning projection 52c and a limiting projection 52d used to be engaged with the clutch lifting platform 608. FIG. 38 illustrates a sectional view of the structure of the clutch lifting platform 608, the valve stem 52 and the restoring spring 605 when assembled. As shown in FIG. 38, when assembled, the positioning projection 52c of the valve stem 52 is located in the positioning groove 608d of the clutch lifting platform 608, and the limiting projection 52d of the valve stem 52 is located in the position limiting table 608e of the clutch lifting platform 608. The restoring spring 605 is received in the groove 608f of the clutch lifting platform 608.

Figure 39:
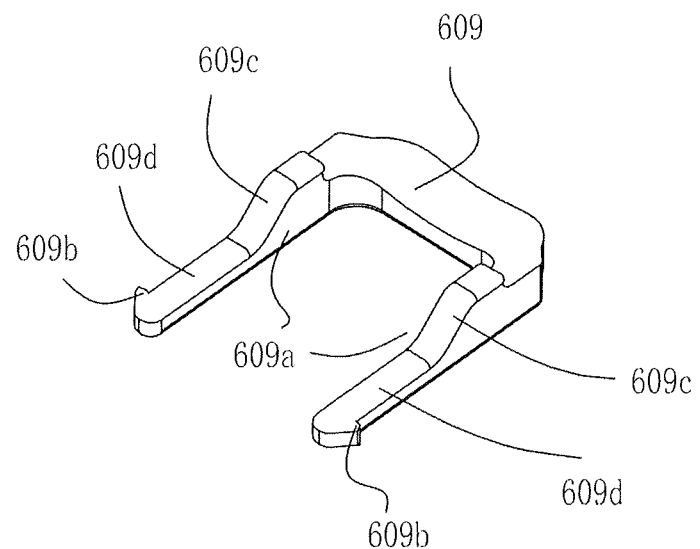
FIG. 39 illustrates a perspective structural view of the control member of the valve opening/closing device according to the third embodiment of the present invention.
Figure 40:
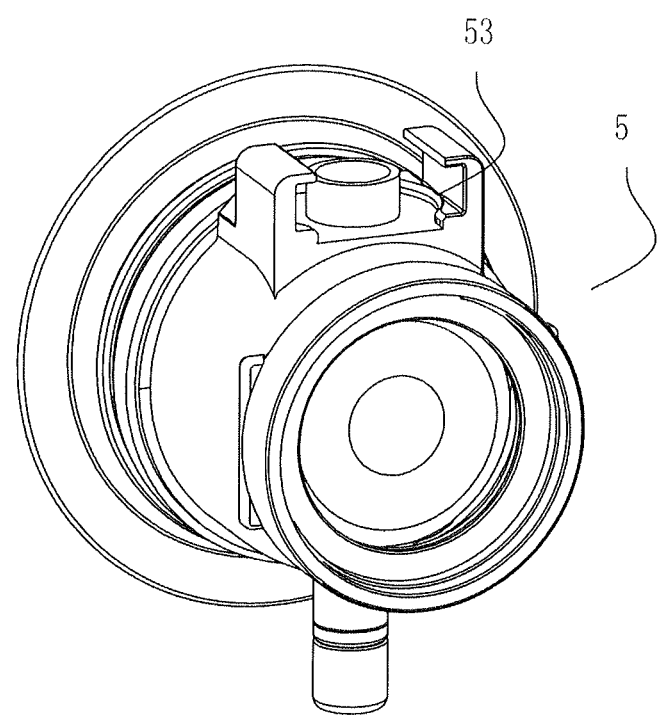
FIG. 40 illustrates a perspective structural view of the valve of the valve opening/closing device according to the third embodiment of the present invention.

FIGS. 39 and 40 show perspective structural views of the control member 609 and the valve 5 according to the third embodiment. As shown in FIG. 39, the control member 609 is a generally U-shaped member. The upper surfaces of the two arms 609a of the U-shaped member are both provided with acting surfaces 609d and bevels 609c. Snaps 609b are provided at the end of the arms 609a. The control member 609 can be snapped into the control member fixing holder 53 provided at the valve 5, and be kept in the fixing holder 53 through the snaps 609b.

Figure 41:
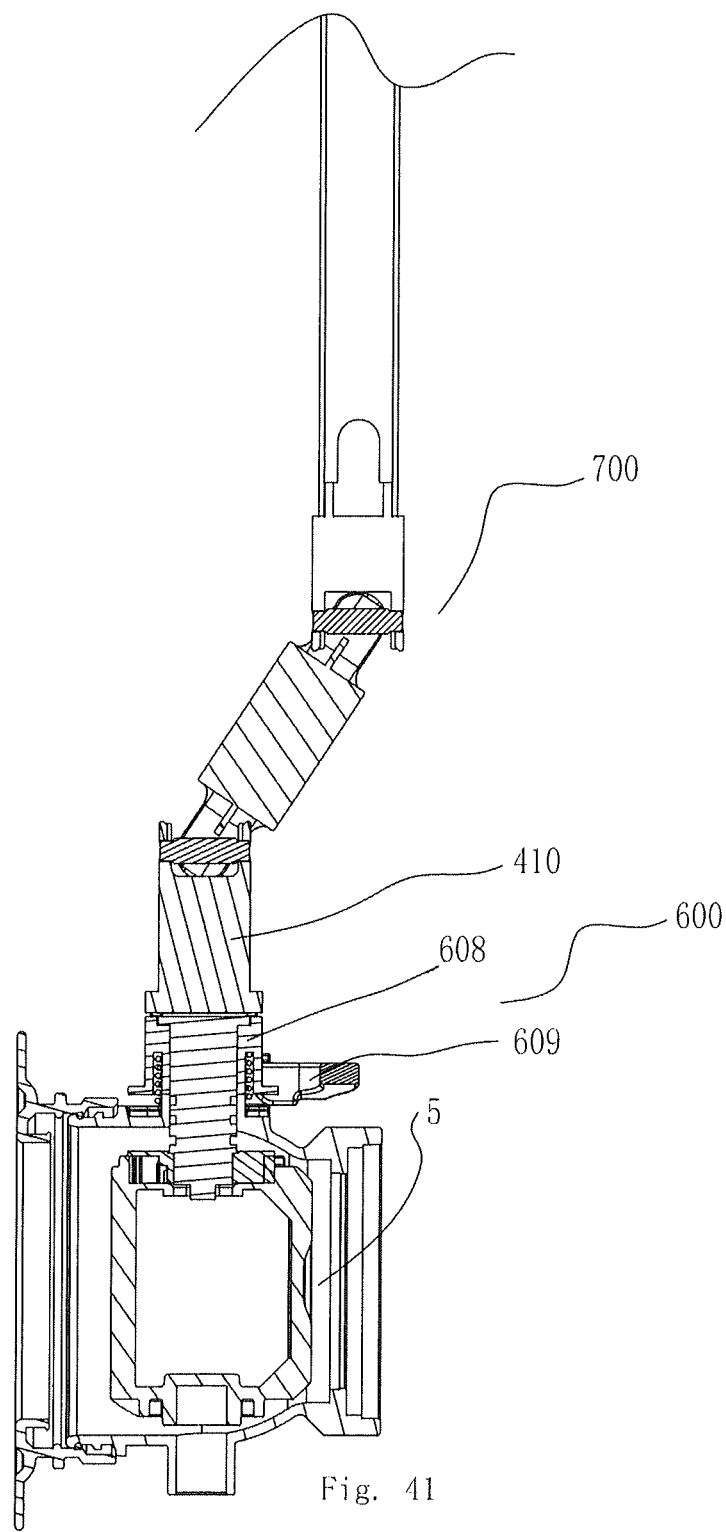
FIG. 41 illustrates a structural sectional view of the motion-transferring device, the clutch device and the valve of the valve opening/closing device which are assembled together according to the third embodiment of the present invention.

FIG. 41 shows sectional views of the structural view of the motion-transferring device 700, the clutch device 600 and the valve 5 when assembled. As shown in FIG. 41, the upper surface of the radial projection 608b of the clutch lifting platform 608 contacts with the acting surface of the control member 609 when assembled. When the cover (not shown) is screwed on, the cover will push the control member 609 to move inward. At the same time, the radial projection 608b will move downward under the action of the bevel 609c. That is, the clutch lifting platform 608 will move downward, disconnecting the "—-shaped connecting head of the lower connecting section 410 and the "—-shaped connecting slot of the clutch lifting platform 608, thereby achieving the effect of separation.

Conversely, when the cover is screwed off, the clutch lifting platform 609 will move upward under the action of the restoring spring 605, connecting the "—"-shaped connecting head of the lower connecting section 410 and the " . "-shaped connecting slot of the clutch lifting platform 608.

FIG. 42 shows the valve opening/closing device in a connected state according to the third embodiment of the present invention. As shown in FIG. 42, in the connected state, i.e., when motion-transferring device 700 is connected to the valve stem 52, the "—"-shaped connecting head of the lower connecting section 410 is received in the " . "-shaped connecting slot of the clutch lifting platform 608, thereby the clutch lifting platform 608 can rotate along with the rotation of the lower connecting section 410. Thus, the valve stem connected to the clutch lifting platform 608 will also rotate along with it, thereby driving the rotation of the valve core connected to the valve stem 52 and achieving the opening/closing of the valve.

FIG. 43 shows the valve opening/closing device in a disconnected state according to the third embodiment of the present invention. As shown in FIG. 43, when the cover is screwed tightly on the valve 5, the cover 51 contacts and presses the control member 609, so that the control member 609 moves forward. At the same time, the clutch lifting platform 602 moves downward under the action of the control member 609, thereby disconnecting the clutch lifting platform 609 and the lower connecting section 410, that is, disconnecting the motion-transferring device 700 and the valve stem 52. Thus, any actions acting on the handle 402 can not be transferred to the valve stem 52 through the valve opening/closing motion-transferring device, which means no matter how the handle 402 motions, the valve will not be opened, thereby preventing mistakenly-opening.

Conversely, when the valve cover 51 is screwed off, the clutch lifting platform 608 moves upward under the action of the restoring spring 605, and is engaged with the lower connecting section 410 again. Thus, actions acting on the handle 402 can be transferred to the valve stem through the motion-transferring device, thereby achieving the opening/closing of the valve.

In the present invention, the rotation of the handle is transferred to the valve stem through the motion-transferring device constituted by the handle connecting member, the connecting tube, the upper connecting section, the middle connecting section, the cross members, and the lower connecting section, thereby achieving the effect of anti mistakenly-opening. Further, the whole valve opening/closing device is located in the cavity between two sidewalls of the side plate of the container, thus the overall volume ratio of the container will not be affected, and the folding rate will not be increased when the side plates are folded.

It should be noted that the above embodiments may have various modifications. For example, the position on the side plate where the handle fixing base locates and the sizes of components can be designed as needed. The handle can be designed to have different shapes, sizes and different directions of acting force, such as pulling force, and pressing force and so on. The handle connecting member may take other forms, as long as one end thereof is fixed inside the handle and can move axially along with the handle while the other end is fixed with the connecting tube through a positioning structure. Alternatively, the handle connecting member can be formed integrally with the connecting tube.

Moreover, when the rotational axis of the handle and the axis of the valve core are in the same line, the middle connecting section can be omitted, so that the upper connecting section is directly engaged with the lower connecting section. Alternately, the upper connecting section is omitted, so that the upper connecting section is formed integrally with the connecting tube. Alternately, all the connecting sections and cross members are omitted, so that one end of the connecting tube is directly connected with the handle.

In addition, the cross member can be omitted, and connecting pins are provided at connecting portions among the upper connecting section, the middle connecting section and the lower connecting section to achieve connection between connecting sections. Moreover, connection between the various components may employ any means known to those skilled in the art.

In addition, the "—"-shaped connecting head on the lower connecting section can be changed to other connecting head with different shapes according to the shape of the valve stem, such as "+"-shape, irregular shapes and so on.

Further, the valve opening/closing device of the present invention may be used in a variety of valves, such as ball valves, butterfly valves and the like, even if it has been not described in the embodiments above.

For the valve opening/closing devices according to the present invention, the operating handle is provided at an appropriate position at the side plate of the container, thereby avoiding bending over or squatting on the ground etc when opening or closing the valve, facilitating use. Further, the motion-transferring device is installed inside the side plate, thus during the usage of the intermediate bulk container, the overall volume ratio will not be affected, and the level of folding will not be increased when folding the intermediate bulk storage container. Moreover, the operating handle or lever on the side plate can be made with arms of different sizes, different lengths, which makes it easy to control the operating force. Besides, the valve opening/closing device of the present invention is also provided with a clutch device. When the valve is closed, the clutch device disconnects the valve stem and the motion-transferring device, thereby preventing the valve from being opened by mistake.

Preferred embodiments of the present invention has been described in detail hereinbefore, but it is to be understood that, after reading the above teachings of the present invention, those skilled in the art may make various modifications or amendments to the present invention. These equivalent forms also fall into the scope limited by appended claims of the present application.

The invention claimed is:

1. An intermediate bulk container,
wherein the container comprises a base and side plates, the side plates are foldable with respect to the base, a valve is installed at the bottom of the container,
a valve opening/closing device comprises a handle, a motion-transferring device, a valve opening/closing mechanism, and a clutch device, wherein:
the motion-transferring device transfers actions acting on the handle to the valve opening/closing mechanism so as to achieve opening/closing of the valve; and
the clutch device engages the motion-transferring device with the valve opening/closing mechanism or disengages the motion-transferring device from the valve opening/closing mechanism, and the clutch device comprises a driving mechanism and a clutch mechanism, wherein:
the driving mechanism is a valve cover, and the driving mechanism drives the clutch mechanism to operate, the driving mechanism directs an engagement between the motion-transferring device and the valve opening/closing mechanism or disengagement between the motion-transferring device and the valve opening/closing mechanism, and
the disengagement prevents the actions acting on the handle from being transferred to the valve opening/closing mechanism and thereby prevents the valve from opening by mistake.

2. The intermediate bulk container according to claim 1, wherein:
the handle is mounted on a side plate of the container and is connected to the motion-transferring device;
the motion-transferring device is received between two sidewalls of the side plates of the container and comprises a connecting tube connected to the handle, a middle connecting section connected to the connecting tube, and a lower connecting section connected to the middle connecting section; and
the connecting tube, the middle connecting section and the lower connecting section constitute a universal mechanism, so that even if the rotating axis of the handle and the rotating axis of a valve stem of the valve are not in a same line, the force acted on the handle will still be transferred to the connecting tube and the lower connecting section, so as to achieve opening/closing of the valve.

3. The intermediate bulk container according to claim 1, wherein the valve opening/closing device further comprises a handle fixing base and a handle restoring spring, wherein the handle fixing base is used to secure the handle and is installed on the side plate of the container, wherein the handle restoring spring is embedded into the handle and is installed in the handle fixing base along with the handle.

4. The intermediate bulk container according to claim 1, wherein the clutch device comprises a clutch rod, a clutch lifting platform, a clutch bracket, a control member and a valve cover, wherein the clutch lifting platform and the control member are installed on the clutch bracket, and the clutch lifting platform can move up and down under the interaction between the control member and the valve cover, so as to achieve the connection and disconnection between the motion-transferring device and a valve stem of the valve.

5. The intermediate bulk container according to claim 4, wherein:
the clutch bracket is provided with rotating pins;
the clutch lifting platform is provided with through-holes for the passage of the valve stem of the valve as well as lifting limiting slots and racks at both sides of the through-holes;
the control member comprises a press-plate, and two arms extending from both ends of the press-plate respectively, wherein the arms are provided with gears at the end of the arms and rotating holes; and
the racks of the clutch lifting platform are engaged with the gears of the control member, and the control member rotates about the rotating pins of the clutch bracket, so that the clutch lifting platform moves up and down, thereby achieving the engagement of the motion-transferring device with the clutch rod or disengagement of the motion-transferring device from the clutch rod.

6. The intermediate bulk container according to claim 4, wherein:
the clutch bracket is provided with rotating pins;
the clutch lifting platform is provided with through-holes for the passage of the valve stem of the valve and lifting limiting slots at both sides of the through-holes;
the control member comprises a press-plate, and two arms extending from both ends of the press-plate, wherein the arms are provided with cams at the end of the arms and rotating holes; and
the control member rotates about the rotating pins of the clutch bracket and the cams of the control member are engaged with the clutch lifting platform, so that the clutch lifting platform moves up and down, thereby achieving the engagement of the motion-transferring device with the clutch lifting platform or disengagement of the motion-transferring device from the clutch lifting platform.

7. The intermediate bulk container according to claim 1, wherein the clutch device comprises a clutch lifting platform, a restoring spring and a control member, wherein a valve stem of the valve is received in the clutch lifting platform, and the clutch lifting platform moves up and down under the interaction between the control member and a valve cover, so as to achieve the engagement of the clutch lifting platform with the motion-transferring device or disengagement of the clutch lifting platform from the motion-transferring device.

8. The intermediate bulk container according to claim 7, wherein:

the valve stem of the valve comprises a rod body, wherein the lower end of the rod body is provided with a spline used to be engaged with a valve core, and the upper end of the rod body is sequentially provided with positioning projections and limiting projections used to be engaged with the clutch lifting platform;

the clutch lifting platform comprises a cylindrical body, wherein the lower end of the cylindrical body is provided with a radial projection, and the upper end of the cylindrical body is provided with a connecting slot used to be engaged with the motion-transferring device, wherein the cylindrical body is further provided with a positioning groove used to be engaged with the positioning projection on the valve stem, a position limiting table used to be engaged with the limiting projection on the valve stem, and a groove used to receive the restoring spring;

the control member is a U-shaped member, and the upper surfaces of the two arms of the U-shaped member are provided with acting surfaces and bevels; and the acting surfaces and bevels of the U-shaped member are engaged with the upper surfaces of the radial projection of the clutch lifting platform when assembled, so as to achieve the ascending/descending of the clutch lifting platform, thereby achieving the engagement of the motion-transferring device with the clutch lifting platform or disengagement of the motion-transferring device from the clutch lifting platform.

* * * * *